US011996050B2

(12) United States Patent
Kubota

(10) Patent No.: US 11,996,050 B2
(45) Date of Patent: May 28, 2024

(54) DISPLAY DEVICE

(71) Applicant: Japan Display Inc., Tokyo (JP)

(72) Inventor: Masahiro Kubota, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/184,799

(22) Filed: Feb. 25, 2021

(65) Prior Publication Data

US 2021/0183316 A1 Jun. 17, 2021

Related U.S. Application Data

(63) Continuation of application No. 16/202,721, filed on Nov. 28, 2018, now Pat. No. 10,957,256.

(30) Foreign Application Priority Data

Nov. 29, 2017 (JP) ................................ 2017-229113

(51) Int. Cl.
*G09G 3/3258* (2016.01)
*G09G 3/3233* (2016.01)

(52) U.S. Cl.
CPC ......... *G09G 3/3258* (2013.01); *G09G 3/3233* (2013.01); *G09G 2300/0819* (2013.01); *G09G 2300/0852* (2013.01); *G09G 2310/08* (2013.01); *G09G 2320/0247* (2013.01); *G09G 2340/0435* (2013.01)

(58) Field of Classification Search
None
See application file for complete search history.

(56) References Cited

U.S. PATENT DOCUMENTS

2005/0068270 A1* 3/2005 Awakura .............. G09G 3/3208 345/76
2007/0115224 A1 5/2007 Yamamoto et al.
2008/0198111 A1 8/2008 Yamashita et al.
2009/0027322 A1* 1/2009 Hosotani .............. G09G 3/3688 345/87
2009/0040173 A1* 2/2009 Ezaki ..................... H05B 45/20 345/102
2009/0167649 A1* 7/2009 Ishizuka .............. G09G 3/3258 345/80
2009/0179839 A1 7/2009 Yamashita et al.
2013/0021312 A1* 1/2013 Kishi .................. G09G 3/3225 345/211
2015/0077412 A1 3/2015 Nakamura

FOREIGN PATENT DOCUMENTS

JP 2009-237426 A 10/2009
JP 2015-055837 A1 3/2015

OTHER PUBLICATIONS

English translation of Office Action issued in related Japanese Patent Application No. 2017-229113 dated Sep. 7, 2021. 5 pages.

* cited by examiner

*Primary Examiner* — Christopher R Lamb
(74) *Attorney, Agent, or Firm* — K&L Gates LLP

(57) ABSTRACT

A display device includes a display area including a plurality of pixels arrayed next to one another in a first direction and in a second direction that is different from the first direction, and a control circuit, wherein each of the pixels includes a light-emitting element configured to emit light by a current flowing therethrough, a drive transistor, a shut-off transistor, and a holding capacitance.

6 Claims, 18 Drawing Sheets

2021

| Lset | Vini |
|---|---|
| Lsetmax ≥ Lset > Lth1 | xx |
| Lth1 ≥ Lset > Lth2 | xx |
| Lth2 ≥ Lset > Lth3 | xx |
| Lth3 ≥ Lset ≥ Lsetmin | xx |

FIG.10

2022

| Lset | EMR |
|---|---|
| Lsetmax ≥ Lset > Lth1 | xx |
| Lth1 ≥ Lset > Lth2 | xx |
| Lth2 ≥ Lset > Lth3 | xx |
| Lth3 ≥ Lset ≥ Lsetmin | xx |

FIG.11

2023

| Lset | AMR |
|---|---|
| Lsetmax | 100 |
| ⋮ | ⋮ |
| Lth1 | 100 |
| ⋮ | ⋮ |
| Lth2 | 100 |
| ⋮ | ⋮ |
| Lth3 | 100 |
| ⋮ | ⋮ |
| Lsetmin | 80 |

DISPLAY DEVICE

CROSS-REFERENCE TO RELATED APPLICATIONS

This application is a continuation of U.S. patent application Ser. No. 16/202,721, filed on Nov. 28, 2018, which claims priority from Japanese Application No. 2017-229113, filed on Nov. 29, 2017, the contents of which are incorporated by reference herein in its entirety.

BACKGROUND

1. Technical Field

The present disclosure relates to a display device.

2. Description of the Related Art

In recent years, there has been an increasing demand for a display device that employs a liquid crystal display panel or an organic EL display panel (Organic Electro-Luminescence Display; OLED) using organic electro-luminescence emission. For example, a technique to improve the dynamic range and the contrast of a display device employing an OLED has been disclosed (for example, Japanese Patent Application Laid-open Publication No. 2015-55837 A).

An organic electro-luminescence element included in a pixel of an OLED is a self-luminous element. Therefore, when display is performed at low luminance, display luminance cannot be controlled by reducing the luminance of a backlight as in the case of a liquid crystal display device. Therefore, when the luminance is set low in luminance setting by a user, if display is performed with the number of gradations lower than the original number of gradations, gradation loss occurs particularly in a low-luminance area, which is not preferable. This inconvenience has been dealt with by adjusting display luminance in a manner such that, within each one-frame period, a non-emission period is provided for which organic EL elements are not allowed to emit light for inserting a black screen (also referred to as black insertion).

When an emission period and a non-emission period of organic EL elements are set within a one-frame period, a phenomenon called flicker is caused by switching between the emission period and the non-emission period. Display quality is likely to deteriorate because switching between the emission period and the non-emission period is visually more recognizable than otherwise.

The present disclosure is aimed at providing a display device that can suppress display quality degradation even under a condition of being set to low luminance.

SUMMARY

A display device according to one embodiment of the present disclosure includes a display area including a plurality of pixels arrayed next to one another in a first direction and in a second direction that is different from the first direction, and a control circuit. Each of the pixels includes a light-emitting element configured to emit light by a current flowing therethrough, a drive transistor, a shut-off transistor, and a holding capacitance, while one terminal of the light-emitting element is coupled to one of a source and a drain of the drive transistor, a first potential is supplied to the other terminal of the light-emitting element, a second potential that is higher than the first potential is supplied to the other one of the source and the drain of the drive transistor via the shut-off transistor, the shut-off transistor supplies or shuts off the second potential to the drive transistor, the holding capacitance is coupled between the source and a gate of the drive transistor, and the control circuit controls the shut-off transistor to have the shut-off transistor on, thereby supplying the second potential to the drive transistor and writing an initialization potential into the gate of the drive transistor, thereafter controls the shut-off transistor to have the shut-off transistor off, thereby shutting off supply of the second potential, writes a video writing potential resulting from a video signal into the gate of the drive transistor, and sets the initialization potential in a manner such that, as a luminance set value for luminance of the video signal is smaller, a potential difference between the source and the gate of the drive transistor is larger.

BRIEF DESCRIPTION OF THE DRAWINGS

FIG. 10 is a diagram illustrating an example of black-insertion rate information stored in the storage circuit;

FIG. 11 is a diagram illustrating an example of video amplitude rate information stored in the storage circuit;

DETAILED DESCRIPTION

Figure 1:
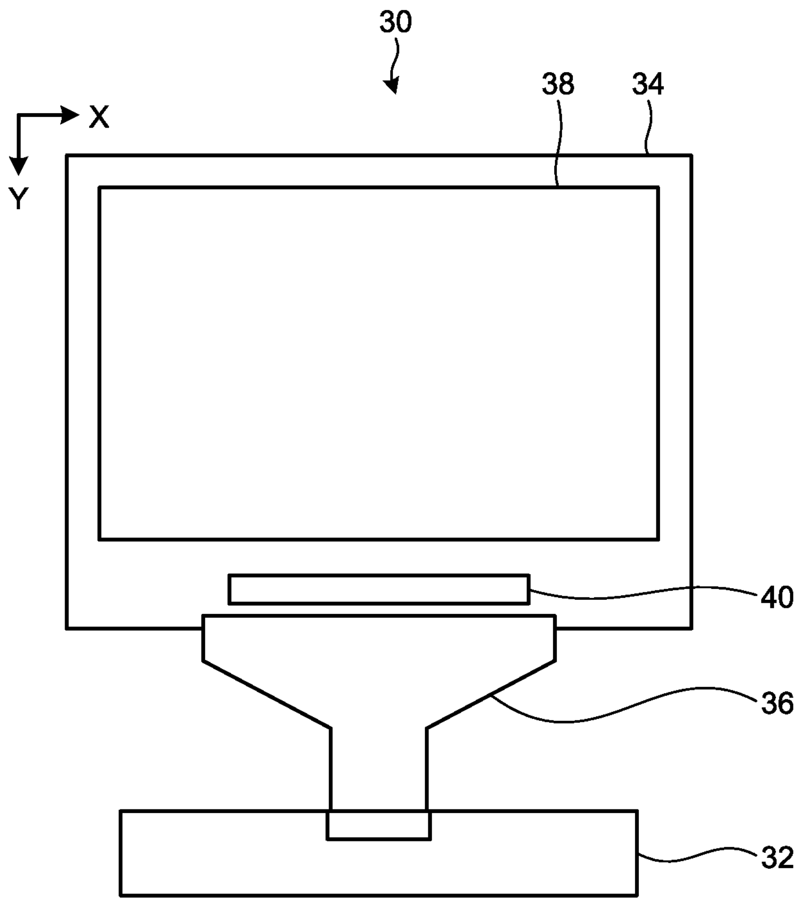
FIG. 1 is a schematic diagram illustrating a schematic configuration of a display device according to a first embodiment.

The following describes embodiments of the present disclosure with reference to the drawings. The disclosure is merely exemplary, and modifications made without departing from the spirit of the disclosure and readily apparent to the skilled person naturally fall within the scope of the present disclosure. The widths, the thicknesses, the shapes, or the like of certain devices in the drawings may be illustrated not-to-scale as compared with actual aspects, for illustrative clarity. However, the drawings are merely exemplary and not intended to limit interpretation of the present disclosure. Throughout the present description and the drawings, the same elements as those already described with reference to the drawing already referred to are assigned the same reference signs, and detailed descriptions thereof are omitted as appropriate.

First Embodiment

FIG. 1 is a schematic diagram illustrating a schematic configuration of a display device according to a first embodiment. This display device 30 includes a circuit substrate (circuit board) 32, a display substrate 34, and a coupling substrate (flexible print circuit board) 36. In the present embodiment, the display device 30 is, for example, an active matrix OLED including an organic EL element (organic light-emitting diode) as a light-emitting element.

The display substrate 34 is provided with a display area 38 in which organic EL elements and pixel circuits corresponding to pixels of the display image are arranged. As a control circuit for controlling the operation of the display area 38, there are provided a drive circuit for supplying various signals to the pixel circuit, and a controller for generating a timing signal and the like to be supplied to the drive circuit. The control circuit is arranged on the circuit substrate 32 or the display substrate 34, for example.

For example, a drive circuit 40 for supplying signals to scan signal lines and video signal lines of the display area 38 can be arranged on the display substrate 34. The main part of the drive circuit 40 is integrated on one or a plurality of semiconductor chips, and the chip is mounted on the display substrate 34. As the drive circuit 40, alternatively, a circuit formed of a thin film transistor (TFT) that uses a semiconductor layer made of a low temperature polysilicon, a transparent amorphous oxide semiconductor (TAOS), or the like can be provided on the display substrate 34. The display substrate 34 can be made of, for example, a flexible material using a glass substrate, a resin film, or the like.

In addition to the control circuit, components such as a power supply circuit for generating various reference potentials, a signal processing circuit for processing a video signal, and a frame memory can be arranged on the circuit substrate 32. The circuit substrate 32 is formed of, for example, a rigid substrate such as a glass epoxy substrate.

The coupling substrate 36 couples the circuit substrate 32 and the display substrate 34 to each other. The coupling substrate 36 can be formed of a flexible wiring substrate. A part or the whole of the drive circuit 40 can be arranged on the coupling substrate 36 alternatively.

Figure 2:
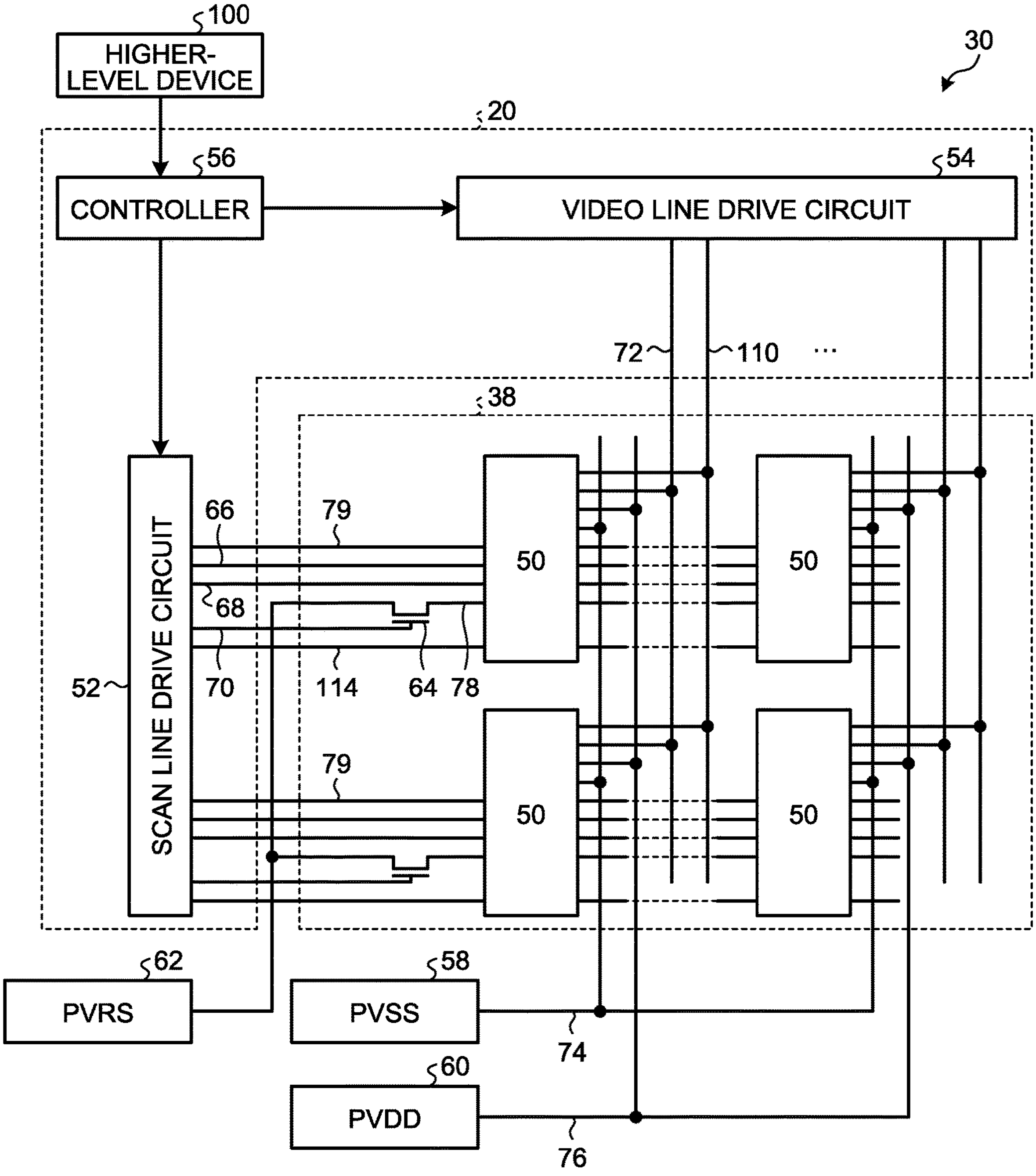
FIG. 2 is a schematic circuit diagram illustrating schematic configurations of the display area and a control circuit in the display device according to the first embodiment.

FIG. 2 is a schematic circuit diagram illustrating schematic configurations of the display area and the control circuit in the display device according to the first embodiment. In the display area 38, a plurality of pixels 50 are arrayed next to one another in the X direction (a first direction) and the Y direction (a second direction) as illustrated in FIG. 1, thus being arranged in a matrix. FIG. 2 illustrates a scan line drive circuit 52, a video line drive circuit 54, and a controller 56 as components of a control circuit 20 and also illustrates a power supply circuit 58, a power supply circuit 60, and a power supply circuit 62 as power supply circuits. The power supply circuit 58 is a reference power supply PVSS that outputs a reference potential $V_{SS}$ (first potential), the power supply circuit 60 is a drive power supply PVDD that outputs a drive potential $V_{DD}$ (second potential), and the power supply circuit 62 is a reset power supply PVRS that outputs a reset potential $V_{RS}$.

Information on video signals to be displayed on the display device 30 according to the first embodiment and setting information of various kinds are input to the controller 56 from a higher-level device 100. In the present embodiment, the setting information includes luminance-setting information. The luminance-setting information is, for example, information including a luminance set value set by an apparatus provided with the display device 30 according to the embodiment or a luminance set value set by a user in accordance with usage conditions. The display device 30 according to the present embodiment performs control corresponding to the luminance set value included in this luminance-setting information.

The scan line drive circuit 52 outputs a control signal for each array (hereinafter also referred to as "pixel row") of the pixels 50 in the X direction (first direction) in the display area 38. Specifically, in the present embodiment, the display area 38 includes four switches (a lighting switch (first shut-off transistor) 94, a writing switch 96, an emission control switch (second shut-off transistor) 97, and an initialization switch 112) in the pixel circuit of each pixel 50, and a reset switch 64 is provided for each pixel row. Correspondingly, five control signal lines (a lighting control line 66, a writing control line 68, a reset control line 70, an emission control line 79, and an initialization control line 114) are provided for each pixel row, and the scan line drive circuit 52 supplies control signals for switching on/off of the above-described switches to the control lines 66, 68, 70, 79, and 114 of each pixel row.

The scan line drive circuit 52 includes a shift register (not illustrated) to sequentially select pixel rows to be operated by the display area 38 in the Y direction (second direction) (for example, from the upper side to the lower side of the screen in FIG. 1), generate control signals for the selected pixel row, and output the signals to the control lines 66, 68, 70, 79, and 114.

The video line drive circuit 54 inputs data (pixel value) representing the video signal at each pixel 50 of the selected pixel row, converts the data into an analog voltage by a digital-to-analog (D/A) converter, and generates a voltage signal corresponding to the pixel value. The video line drive circuit 54 generates the voltage signal for each pixel row. Video signal lines (first signal lines) 72 are provided corresponding to the respective arrays (hereinafter also referred to as "pixel columns") of the pixels 50 in the Y direction (second direction) in the display area 38. The video line drive circuit 54 sequentially outputs a voltage signal (video voltage signal) VSIG indicating the pixel value of each pixel 50 of each selected pixel row at the time of writing operation of data to each pixel 50 from one selected pixel row to another.

The power supply circuit 58 generates the reference potential $V_{SS}$ as described above. The reference potential $V_{SS}$ is supplied to each pixel 50 via a power supply line 74.

The power supply circuit 60 generates the drive potential $V_{DD}$ as described above. The drive potential $V_{DD}$ is supplied to each pixel 50 via a power supply line 76 as described above.

The power supply circuit 62 generates the reset potential $V_{RS}$ as described above. The reset potential $V_{RS}$ is supplied to each pixel 50 via the reset switch 64 and a reset line 78 that are provided for the corresponding pixel row.

Figure 3:
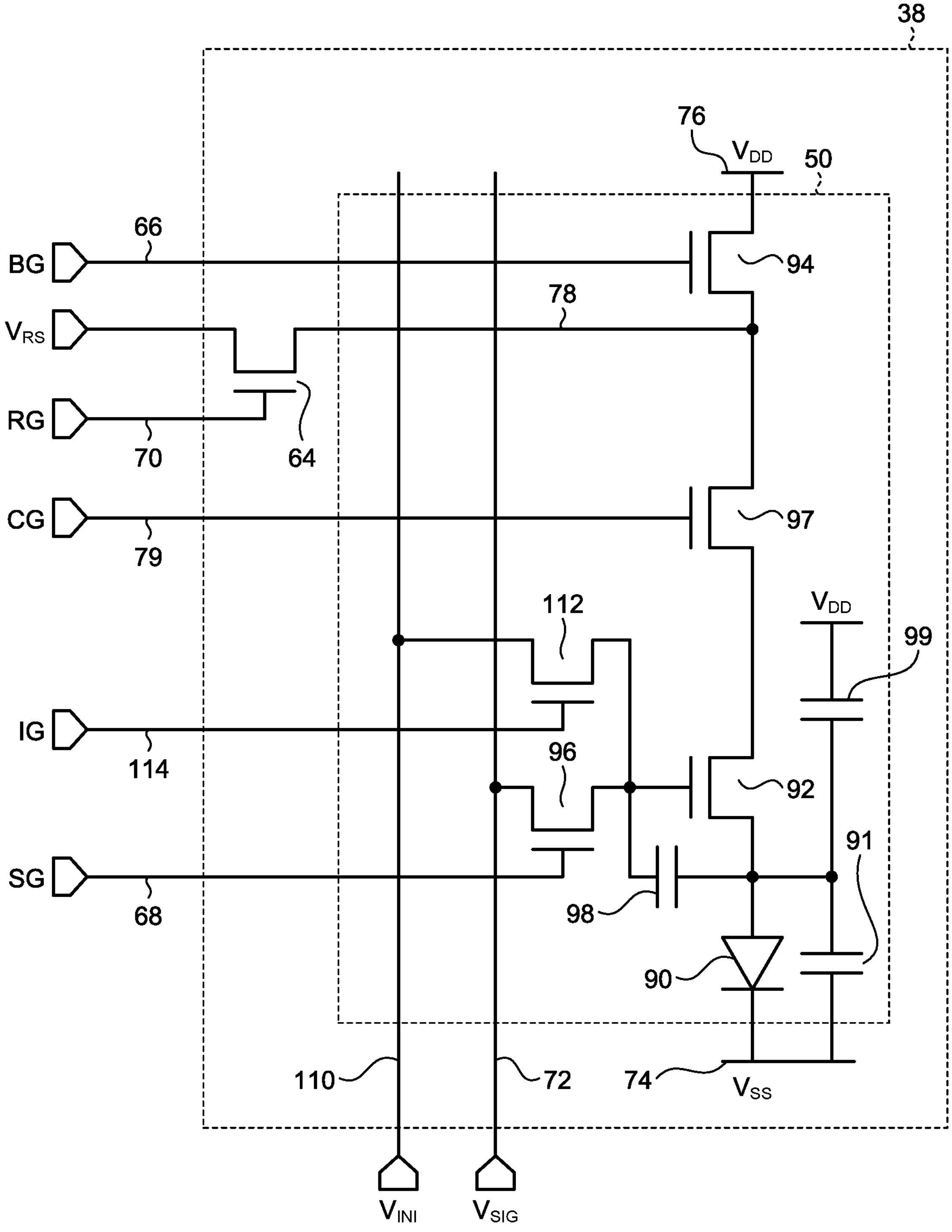
FIG. 3 is an example of a schematic equivalent circuit diagram of a pixel arranged in the display area illustrated in FIG. 2.

FIG. 3 is an example of a schematic equivalent circuit diagram of a pixel arranged in the display area illustrated in FIG. 2.

Each pixel 50 includes an organic light-emitting diode (organic EL element) 90 as a light-emitting element. In the present embodiment, the organic light-emitting diode 90 includes an anode electrode, a cathode electrode, and an organic material layer such as a light emitting layer between the electrodes. The cathode electrode can be a common electrode integrally formed over a plurality of pixels of the display area 38. The emission color of the organic light-emitting diode 90 may be, for example, red, green, blue, or white. The display device 30 may be configured to be capable of color display with the pixels 50, each of which includes the organic light-emitting diodes 90 having emission colors such as red, green, blue, and white, arrayed regularly in the X direction (first direction) or in the Y direction (second direction) in the display area 38.

The cathode electrode of the organic light-emitting diode 90 is coupled to the power supply line 74. The anode electrode of the organic light-emitting diode 90 is coupled to the power supply line 76 via a drive transistor 92 and a lighting switch 94.

As described above, a certain high potential as the drive potential $V_{DD}$ is applied to the power supply line 76 from the drive power supply PVDD (power supply circuit 60), and a certain low potential is applied as the reference potential $V_{SS}$ to the power supply line 74 from the reference power supply $PV_{SS}$ (power supply circuit 58).

The organic light-emitting diode 90 emits light when a forward-direction current (drive current) is supplied due to the potential difference ($V_{DD}$–$V_{SS}$) between the drive potential $V_{DD}$ and the reference potential $V_{SS}$. That is, the drive potential $V_{DD}$ has a potential difference that causes the organic light-emitting diode 90 to emit light with respect to the reference potential $V_{SS}$. The organic light-emitting diode 90 is configured as an equivalent circuit having a capacitance 91 coupled in parallel thereto between an anode electrode and a cathode electrode thereof. An additional capacitance 99 is provided between the anode electrode of the organic light-emitting diode 90 and the power supply line 76 that supplies the drive potential $V_{DD}$. The capacitance 91 may be coupled to a reference potential other than the anode electrode and the cathode electrode.

In the present embodiment, the drive transistor 92, the lighting switch 94, and the emission control switch 97 are each formed of an n-type TFT. A source electrode that is one (first terminal) of the two current terminals of the drive transistor 92 is coupled to the anode electrode (pixel electrode) of the organic light-emitting diode 90, and a drain electrode that is the other (second terminal) thereof is coupled to the source electrode of the emission control switch 97. The gate electrode of the emission control switch 97 is coupled to the emission control line 79. The drain electrode of the emission control switch 97 is coupled to the source electrode of the lighting switch 94. The gate electrode of the lighting switch 94 is coupled to the lighting control line 66. The drain electrode of lighting switch 94 is coupled to the power supply line 76.

The drain electrode of the drive transistor 92 is also coupled to the reset power supply PVRS (power supply circuit 62) via the reset switch 64. As already described, in the present embodiment, the reset line 78 and the reset switch 64 are provided for each pixel row. The reset lines 78 extend along the respective pixel rows and are each coupled via the emission control switch 97 of the corresponding pixel row to all of the drain electrodes of the drive transistors 92 of that pixel row. That is, a plurality of pixels 50 included in each pixel row shares one of the reset lines 78 and one of the reset switches 64. The reset switch 64 is placed, for example, at the end of the pixel row and switches between coupling and decoupling of the reset line 78 to and from the reset power supply PVRS, that is, whether to couple or decouple them. In the present embodiment, the reset switch 64 is formed of an n-type TFT like the drive transistor 92, the lighting switch 94, and the emission control switch 97.

The gate electrode, which is the control terminal of the drive transistor 92, is coupled to the video signal line (first signal line) 72 via the writing switch 96 and is coupled to an initialization signal line (second signal line) 110 via the initialization switch 112. A holding capacitance 98 is coupled between the source and the gate electrodes of the drive transistor 92. In the present embodiment, the writing switch 96 and the initialization switch 112 are each formed of an n-type TFT like the drive transistor 92, the lighting switch 94, and the reset switch 64.

In the present embodiment, a circuit example in which the drive transistor 92, the lighting switch 94, the reset switch 64, the writing switch 96, the emission control switch 97, and the initialization switch 112 are formed of n-type TFTs is presented, but is not limiting. For example, the drive transistor 92, the lighting switch 94, the reset switch 64, the writing switch 96, the emission control switch 97, and the initialization switch 112 may be circuits formed of p-type TFTs. The circuit configuration in which a p-type TFT and an n-type TFT are combined may be used. Hereinbelow, a case in which the drive transistor 92, the lighting switch 94, the reset switch 64, the writing switch 96, the emission control switch 97, and the initialization switch 112 are n-type TFTs will be presented as an example.

As described above, the lighting switch 94, the writing switch 96, the reset switch 64, the emission control switch 97, and the initialization switch 112 are controlled to be on or off by use of the lighting control line 66, the writing control line 68, the reset control line 70, the emission control line 79, and the initialization control line 114 that are provided to each pixel row. The lighting control line 66, the writing control line 68, the emission control line 79, and the initialization control line 114 extend along the pixel row and are coupled to the gate electrodes of the lighting switch 94, the writing switch 96, the emission control switch 97, and the initialization switch 112 of the pixel row in common.

Figure 4:
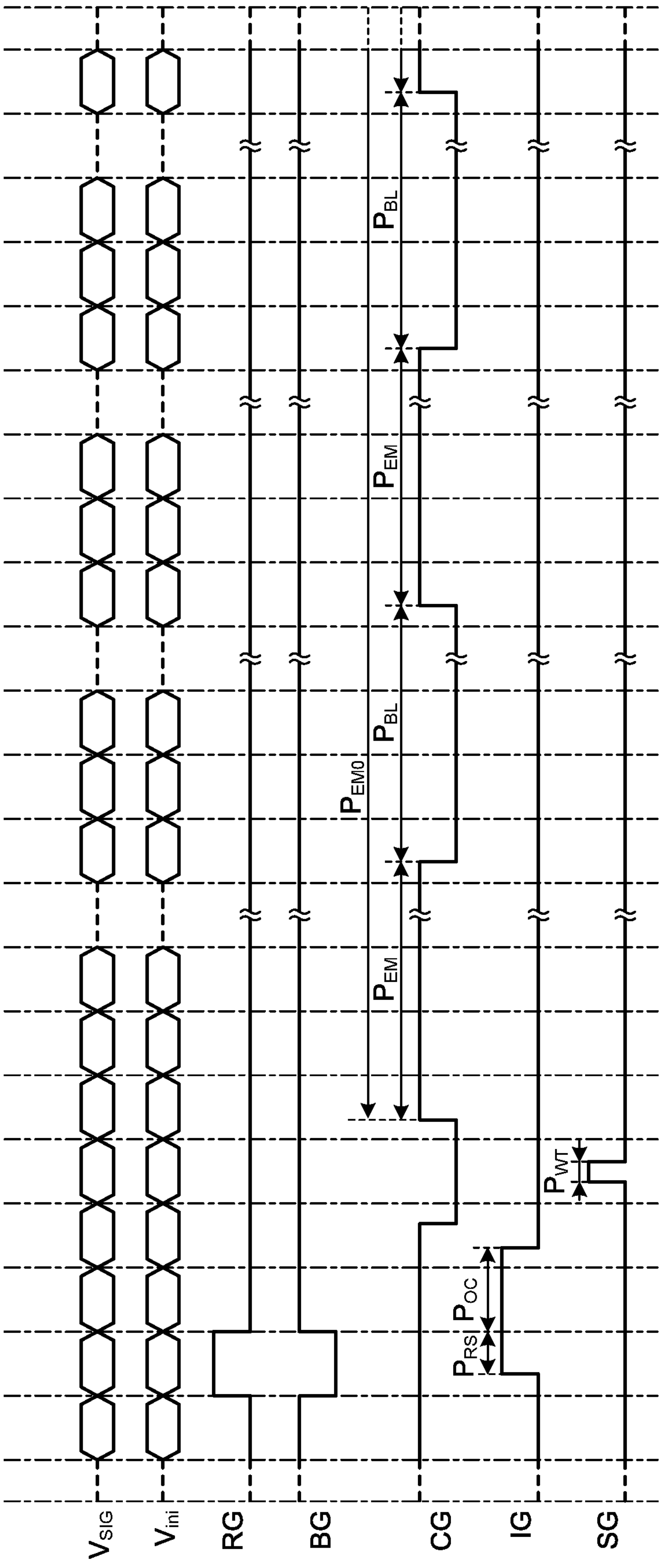
FIG. 4 is a schematic timing chart for explaining a driving method for the display device according to the first embodiment.

FIG. 4 is a schematic timing chart for explaining a driving method for the display device according to the first embodiment. FIG. 4 illustrates changes of various signals in the writing operation of pixel values and the emission operation in one pixel row of the display area 38.

In FIG. 4, the horizontal axis represents the time axis, and the rightward direction is the passage of time. The various signals illustrated in FIG. 4 are: a writing control signal SG for the writing switch 96 that controls writing of the video voltage signal VSIG supplied from the video line drive circuit 54 to the video signal line (first signal line) 72; a lighting control signal BG for the lighting switch 94; the reset control signal RG for the reset switch 64; an emission control signal CG for the emission control switch 97; and an initialization control signal IG for the initialization switch 112 that controls writing of the initialization voltage signal VINI supplied from the video line drive circuit 54 to the initialization signal line (second signal line) 110. The scan line drive circuit 52 sets each control signal to either the L level or the H level. In the present embodiment, the writing switch 96, the lighting switch 94, the reset switch 64, the emission control switch 97, and the initialization switch 112, which are formed of n-type TFTs, are turned on at the H level and turned off at the L level.

In the present embodiment, a plurality of pixel rows included in the display area 38 are sequentially selected from the first row (for example, the pixel row located at the uppermost position in the display area 38 in FIG. 1), and the operation of writing the potentials Vsig (video writing potentials) of the video voltage signals VSIG into pixels in the selected pixel rows to cause the organic light-emitting diodes 90 to emit light is repeated for each image of one frame.

In the present embodiment, every one horizontal scan period, the video line drive circuit 54 applies the potential Vsig (video writing potential) of the video voltage signal VSIG to the video signal line (first signal line) 72 and applies the potential Vini (initialization potential) of the initialization voltage signal VINI to the initialization signal line (second signal line) 110.

The writing operation in the present embodiment is specifically divided into a reset operation, an offset cancelling operation, and a video signal setting operation. In the example illustrated in FIG. 4, the reset period $P_{RS}$ corresponds to the reset operation, the offset cancelling period $P_{OC}$ corresponds to the offset cancelling operation, and the video signal setting period $P_{WT}$ corresponds to the video signal setting operation.

The reset operation is an operation of resetting voltages held in the capacitance 91, the holding capacitance 98, and the additional capacitance 99. As a result, the data written into the pixels 50 in the previous frame according to the video signal is reset.

Specifically, in reset operation, the lighting switch 94 is turned off by setting the lighting control signal BG to the L level, the reset switch 64 is turned on by setting the reset control signal RG to the H level, and further, the initialization switch 112 is turned on by setting the initialization control signal IG to the H level with the potentials Vini (initialization potentials) of the initialization voltage signals VINI applied to the respective initialization signal lines (second signal lines) 110. The emission control switch 97 is then on by setting the emission control line 79 at the H level.

As a result, the potential corresponding to the potential Vini (initialization potential) of the initialization voltage signal VINI is applied to the gate potential of the drive transistor 92, and a voltage corresponding to the reset potential $V_{RS}$ is applied to the anode electrode side of the organic light-emitting diode 90. As a result, the source potential of the drive transistor 92 is reset to a potential corresponding to the reset potential $V_{RS}$, and the terminal-to-terminal voltage of the holding capacitance 98 of each pixel 50 is set to a voltage corresponding to $(Vini-V_{RS})$. The voltage applied to the organic light-emitting diode 90 reaches a voltage corresponding to $(V_{RS}-V_{SS})$, and the reset potential $V_{RS}$ is set so that this voltage can be lower than or equal to an emission threshold voltage (light emission starting voltage) of the organic light-emitting diode 90. The emission threshold voltage is a voltage at which a current begins to flow through the organic light-emitting diode 90, that is, a forward voltage drop VF. The potential Vini (initialization potential) of the initialization voltage signal VINI can be set to 1 V, for example. For example, when the reference potential $V_{SS}$ is set to −1 V, the reset potential $V_{RS}$ can be set to −3 V. That is, the reset potential $V_{RS}$ is set to a potential such that no current flows through the organic light-emitting diode 90 during the reset operation.

The offset cancelling operation is operation for compensating variations in threshold voltage Vth of the drive transistors 92.

Specifically, in the offset cancelling operation, the reset switch 64 is turned off by setting the reset control signal RG to the L level, the initialization switch 112 and the lighting switch 94 are turned on by setting the lighting control signal BG and the initialization control signal IG to the H level, and the potential Vini (initialization potential) of the initialization voltage signal VINI is applied to each of the initialization signal lines (second signal lines) 110. The emission control switch 97 is then on by maintaining the emission control line 79 at the H level.

As a result, the gate potential of the drive transistor 92 is fixed at a potential corresponding to the potential Vini (initialization potential) of the initialization voltage signal VINI. Because the lighting switch 94 and the emission control switch 97 are on, a current flows into the drive transistor 92 from the drive power supply PVDD, so that the source potential of the drive transistor 92 rises from the reset potential $V_{RS}$ that has been written during the reset period $P_{RS}$. When the source potential reaches a potential (Vini−Vth) that is Vth lower than the gate potential, the drive transistor 92 becomes substantially non-conductive, so that while the source potential of the drive transistor 92 is fixed at the potential (Vini−Vth), the terminal-to-terminal voltage of the holding capacitance 98 is set to a voltage corresponding to the threshold voltage Vth of the drive transistor 92. On the basis of this state, the video signal setting operation is performed to set the emission control signal CG to the L level to turn the emission control switch 97 off and to write a voltage corresponding to the potential Vsig (video writing potential) of the video voltage signal VSIG into the holding capacitance 98. Consequently, effects attributable to variations in the threshold voltage Vth of the drive transistors 92 among the pixels 50 as a result of the emission operation are cancelled.

The video signal setting operation is operation of writing the potential Vsig (video writing potential) of the video voltage signal VSIG into each of the pixels 50.

In the video signal setting period $P_{WT}$, the reset control signal RG is maintained at the L level and the lighting control signal BG at the H level continuously from the offset cancelling period $P_{OC}$. The emission control signal CG is set to the L level, so that the emission control switch 97 is turned off and that a current is stopped from flowing into the drive transistor 92 from the drive power supply PVDD (power supply circuit 60). In this state, when the writing switch 96 is turned on by setting the writing control signal SG to the H level while the potential Vsig (video writing potential) of the video voltage signal VSIG is supplied to each of the video signal lines (first signal lines) 72, the capacitance 91, the holding capacitance 98, and the additional capacitance 99 are charged and the gate potential of the drive transistor 92 rises to a potential corresponding to the potential Vsig (video writing potential) of the video voltage signal VSIG from a potential corresponding to the potential Vini (initialization potential) of the initialization voltage signal VINI.

Thereafter, when the video signal setting operation is ended by turning off the writing switch 96, an emission-enabled period $P_{EM0}$ is entered in which the organic light-emitting diode 90 can emit light. In this emission-enabled period $P_{EM0}$, when the emission control switch 97 is turned on by setting the emission control signal CG to the H level, the organic light-emitting diode 90 emits light with an intensity corresponding to the potential Vsig (video writing potential) of the video voltage signal VSIG. That is, even after the writing switch 96 is turned off, the drive transistor 92 that has become conductive in the video signal setting operation is maintained conductive by the voltage held by the holding capacitance 98, and a drive current corresponding to the potential Vsig (video writing potential) of the video voltage signal VSIG is supplied to the organic light-emitting diode 90. As a result, the organic light-emitting diode 90 emits light with luminance corresponding to the potential Vsig (video writing potential) of the video voltage signal VSIG.

The above-described writing operation (the reset operation, the offset cancelling operation, and the video signal setting operation) and emission operation are sequentially performed with respect to each pixel row included in the display area 38. The pixel rows are sequentially selected, for example, in cycles of one horizontal scan period of a video signal, and the writing operation and the emission operation for each pixel row are repeated in cycles of one frame period.

An emission-enabled period $P_{EM0}$ of each pixel row is set within a period that spans from the end of the above-described video signal setting operation until the start of the writing operation with respect to that pixel row for an image of the next frame. In the display device 30, the emission-enabled period $P_{EM0}$ includes: the emission period $P_{EM}$ for which the organic light-emitting diode 90 is caused to emit light with an intensity corresponding to the potential Vsig (video writing potential) of the video voltage signal VSIG written into the corresponding pixel 50; and a non-emission period $P_{BL}$ for which the drive current is forced to stop being supplied to the organic light-emitting diode 90. Specifically, for the emission period $P_{EM}$, the emission control switch 97 is turned on by setting the emission control signal CG to the H level, so that a forward-direction current (drive current) is supplied to the organic light-emitting diode 90 from the drive power supply PVDD. For the non-emission period $P_{BL}$, the emission control switch 97 is turned off by setting the emission control signal CG to the L level, so that the drive power supply PVDD and the drive transistor 92 maintained conductive are decoupled from each other, whereby the forward-direction current (drive current) is forced to stop being supplied to the organic light-emitting diode 90.

In the present embodiment, the proportion of the non-emission period $P_{BL}$ to the emission-enabled period $P_{EM0}$ is changed in accordance with a luminance set value that is included in the luminance-setting information input from the higher-level device 100.

In the present embodiment, the potential Vini (the initialization potential) of the initialization voltage signal VINI to be written into the pixel 50 during the above-described reset operation and offset cancelling operation is changed in accordance with the luminance set value that is included in the luminance-setting information input from the higher-level device 100.

Hereinafter, the concept of changing the potential Vini (initialization potential) of an initialization voltage signal VINI in accordance with the luminance set value is explained.

The terminal-to-terminal voltage of the holding capacitance 98 in each pixel 50 in the pixel configuration illustrated in FIG. 3, that is, the gate-source voltage Vgs. of the drive transistor 92 can be expressed by Mathematical Expression (1) with the capacitance value of the holding capacitance 98 denoted as Cs, the capacitance value of the additional capacitance 99 denoted as Cad, and the capacitance value of the capacitance 91 denoted as Cel.

$$Vgs = Vsig - (Vini - Vth + (Vsig - Vini) * Cs/(Cs + Cad + Cel)) = (Vsig - Vini) * ((Cad + Cel)/(Cs + Cad + Cel)) + Vth \quad (1)$$

As expressed by Mathematical Expression (1) above, the gate-source voltage Vgs of the drive transistor 92 becomes a voltage proportional to the potential difference (Vsig−Vini) between the potential Vsig (video writing potential) of the video voltage signal VSIG and the potential Vini (initialization potential) of the initialization voltage signal VINI. Thus, a forward-direction current (drive current) corresponding to the voltage is supplied to the organic light-emitting diode 90 via the drive transistor 92, and the organic light-emitting diode 90 emits light in accordance with the forward-direction current (drive current), so that gradations are displayed in the respective pixels 50. That is, the gate-source voltage Vgs of the drive transistor 92 is smaller as the potential Vini (initialization potential) of the initialization voltage signal is higher relative to the potential Vsig (video writing potential) of the video voltage signal VSIG.

Figure 5:
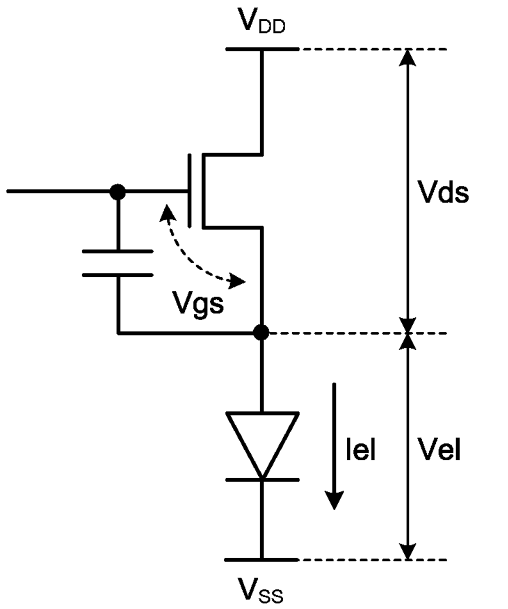
FIG. 5 is a diagram illustrating the configuration of a pixel simplified into a drive transistor and an organic light-emitting diode.
Figure 6:
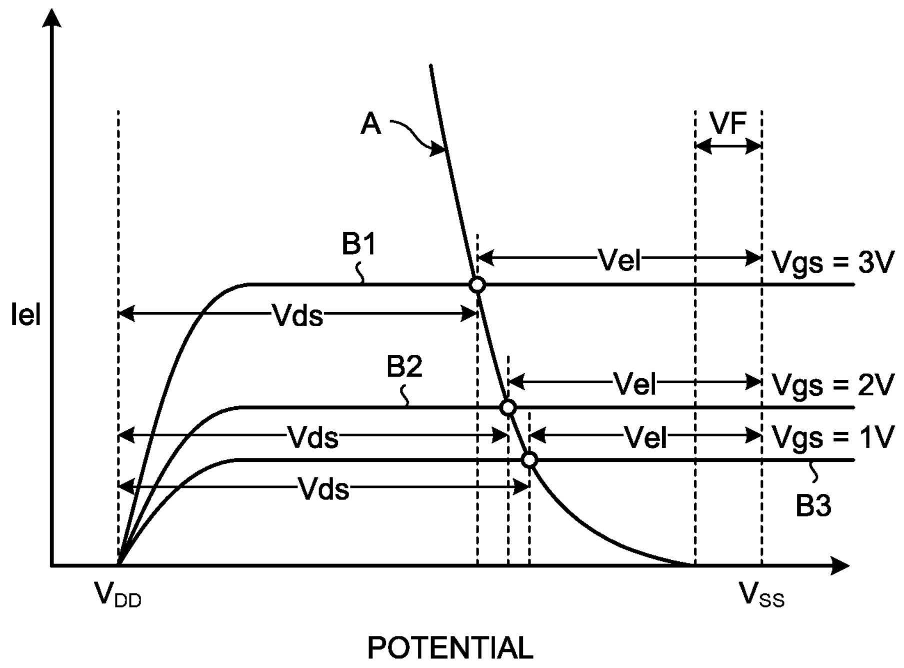
FIG. 6 is a diagram illustrating the voltage-current characteristics of the drive transistor and the organic light-emitting diode that are illustrated in FIG. 5.

FIG. 5 is a diagram illustrating the configuration of a pixel simplified into a drive transistor and an organic light-emitting diode. FIG. 6 is a diagram illustrating the voltage-current characteristics of the drive transistor and the organic light-emitting diode that are illustrated in FIG. 5. In FIG. 6, the horizontal axis indicates the potential difference between the drive potential $V_{DD}$ and the reference potential $V_{SS}$, and the vertical axis indicates the forward-direction current (drive current) Iel that flows through the organic light-emitting diode. FIG. 6 exemplifies a voltage-current characteristic A of the organic light-emitting diode, and also exemplifies voltage-current characteristics B1, B2, and B3 of the drive transistor that correspond to cases in which the drive transistor has gate-source voltages Vgs of 3 V, 2 V, and 1 V.

In the present embodiment, the organic light-emitting diode is caused to emit light when the drive transistor is in a saturation region thereof. The anode-cathode voltage Vel of the organic light-emitting diode corresponds to the distance in the horizontal-axis direction between the voltage-current characteristic A illustrated in FIG. 6 of the organic light-emitting diode and the reference potential $V_{SS}$. As the gate-source voltage Vgs of the drive transistor is smaller, the drain-source voltage Vds of the drive transistor is larger, and the anode-cathode voltage Vel of the organic light-emitting diode is smaller. That is, as illustrated in FIG. 6, when the gate-source voltage Vgs decreases, a forward-direction current (drive current) Iel flowing through the organic light-emitting diode accordingly decreases, and the anode potential (an intersection of the voltage-current characteristic of the drive transistor and the voltage-current characteristic of the organic light-emitting diode) of the organic light-emitting diode decreases. Thus, the luminance of the organic light-emitting diode can be decreased if the gate-source voltage Vgs of the drive transistor is decreased.

Figure 7A:
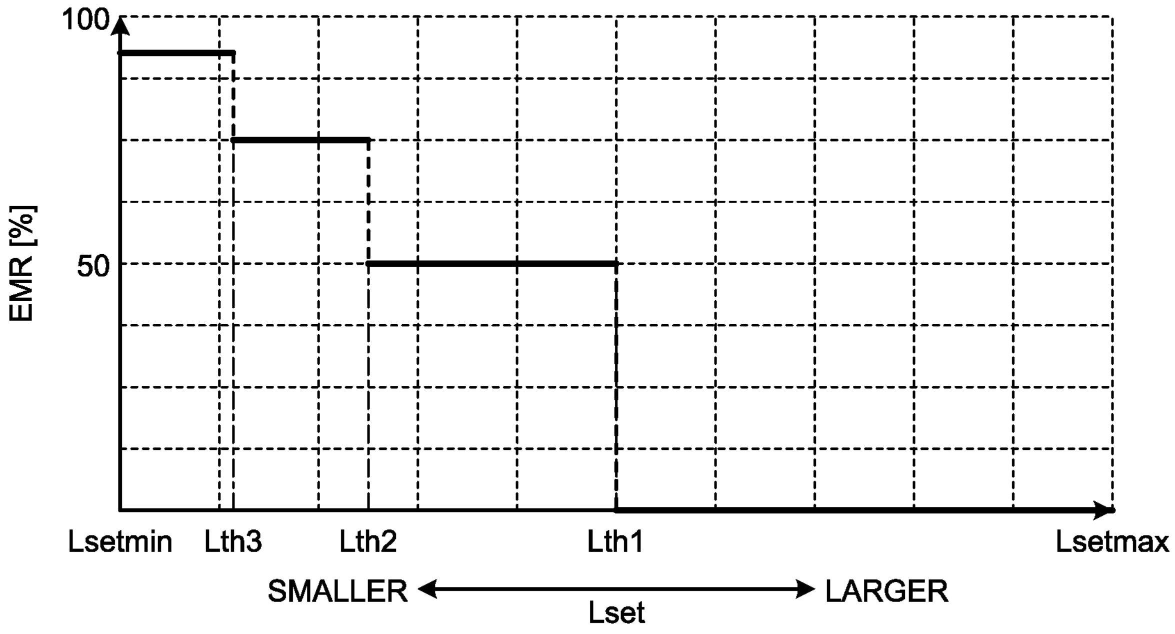
FIG. 7A is a diagram illustrating an example of changing the proportion of a non-emission period to an emission-enabled period in accordance with a luminance set value in a comparative example for the display device according to the first embodiment.
Figure 7B:
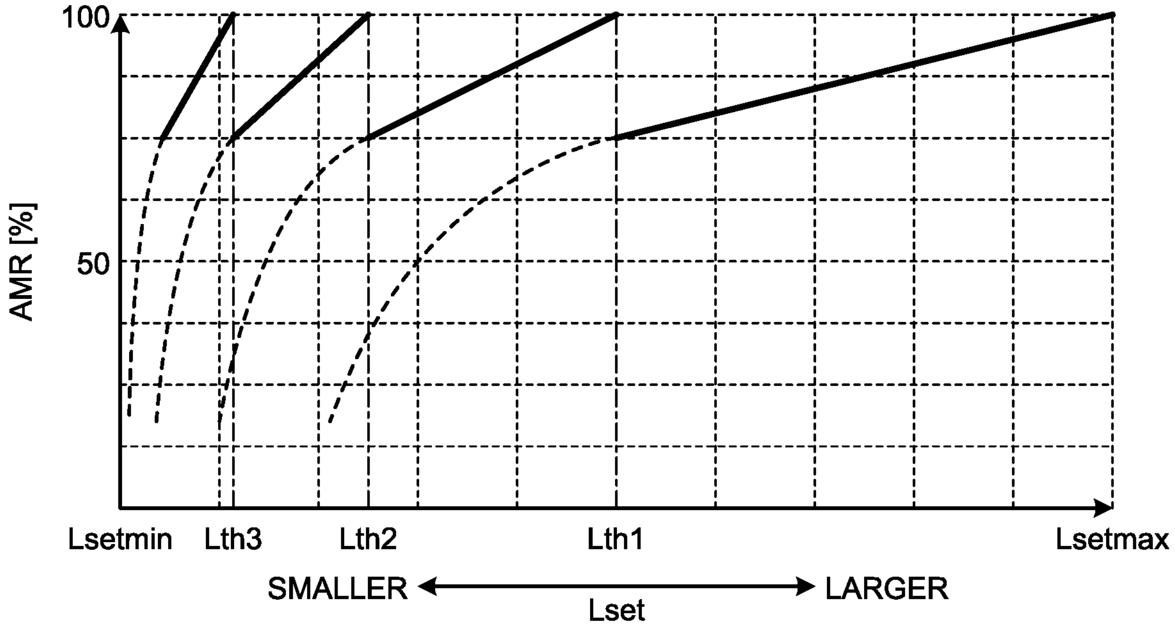
FIG. 7B is a diagram illustrating an example of the proportion of a second amplitude to a first amplitude when the proportion of a non-emission period to an emission-enabled period is changed in accordance with a luminance set value, the first amplitude being the amplitude of the potential (video writing potential) of a video voltage signal before luminance setting is applied, the second amplitude being the amplitude thereof after the luminance setting is applied.
Figure 7C:
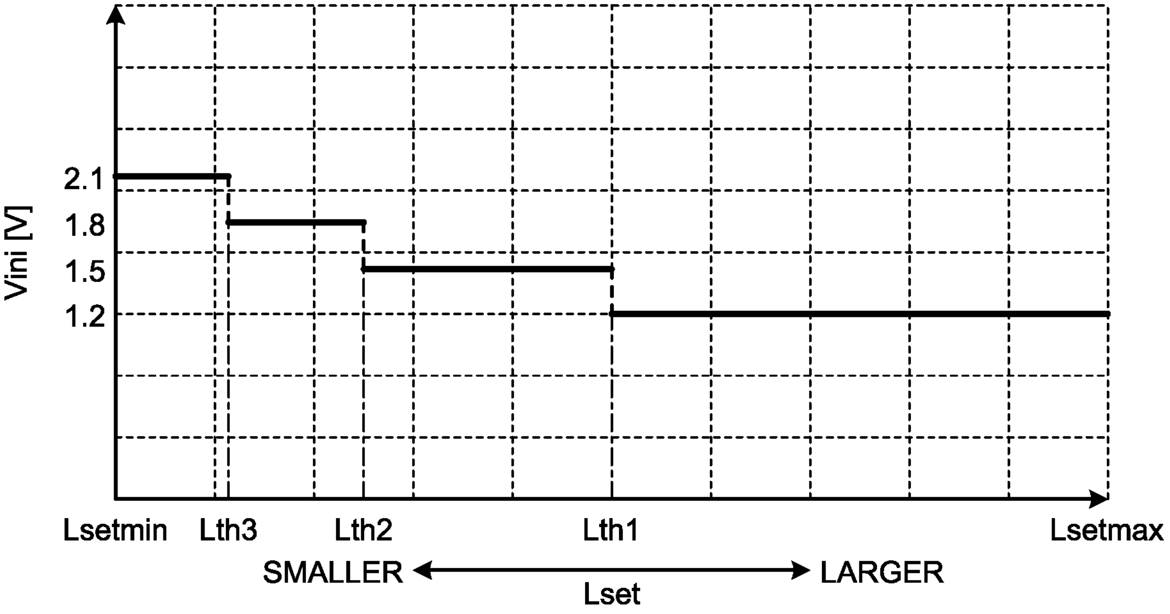
FIG. 7C is a diagram illustrating an example of changing a potential (initialization potential) of an initialization voltage signal in accordance with a luminance set value in the display device according to the first embodiment.
Figure 7D:
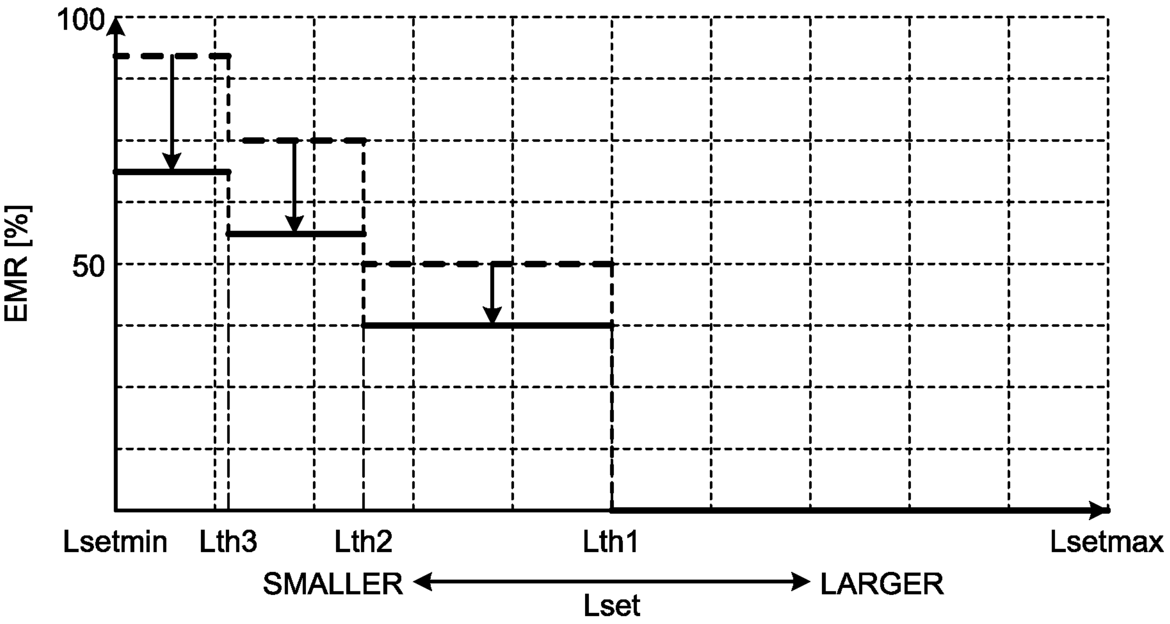
FIG. 7D is a diagram illustrating an example of changing the proportion of a non-emission period to an emission-enabled period in accordance with a luminance set value in the display device according to the first embodiment.

FIG. 7A is a diagram illustrating an example of changing a black-insertion rate in accordance with a luminance set value in a comparative example for the display device according to the first embodiment. FIG. 7B is a diagram illustrating an example of video amplitude rates corresponding to luminance set values. FIG. 7C is a diagram illustrating an example of changing an initialization potential in accordance with a luminance set value in the display device according to the first embodiment. FIG. 7D is a diagram illustrating an example of changing a black-insertion rate in accordance with a luminance set value in the display device according to the first embodiment.

In each of FIG. 7A, FIG. 7B, FIG. 7C, and FIG. 7D, the horizontal axis indicates luminance set values Lset. In each of FIG. 7A and FIG. 7D, the vertical axis indicates the proportion (hereinafter referred to also as "black-insertion rate") EMR of a non-emission period $P_{BL}$ to an emission-enabled period $P_{EM0}$. In FIG. 7B, the vertical axis indicates a video amplitude rate AMR. The video amplitude rate AMR indicates the proportion of the amplitude of the potential Vsig (video writing potential) of a video voltage signal VSIG after reflection of a luminance set value to the amplitude of the potential Vsig (video writing potential) of the video voltage signal VSIG before the reflection of the luminance set value. In FIG. 7C, the vertical axis indicates the potential Vini (initialization potential) of an initialization voltage signal VINI. FIG. 7A, FIG. 7B, FIG. 7C, and FIG. 7D illustrate examples in each of which a first threshold, a second threshold, and a third threshold (Lth1>Lth2>Lth3) are set as thresholds for luminance set values Lset.

The video amplitude rate AMR is determined by the number of gradations before D/A conversion in the process of generating the video voltage signal VSIG in the video line drive circuit 54. That is, when the video amplitude rate AMR is small, gradation loss occurs particularly in a region with lower luminance, which is not preferable.

The example illustrated in FIG. 7B is designed to have the video amplitude rate AMR at least 80% in each of the following set ranges: a first range (Lsetmax≥Lset>Lth1) not larger than the maximum value (hereinafter referred to as "maximum luminance set value") Lsetmax for the luminance set value Lset and larger than the first threshold Lth1; a second range (Lth1≥Lset>Lth2) not larger than the first threshold Lth1 and larger than the second threshold Lth2; a third range (Lth2≥Lset>Lth3) not larger than the second threshold Lth2 and larger than the third threshold Lth3; and the fourth range (Lth3≥Lset≥Lsetmin) not larger than the third threshold Lth3 and not smaller than the minimum value (hereinafter referred to as "minimum luminance set value") Lsetmin for the luminance set value Lset.

Specifically, in the first range, the video amplitude rate AMR is 100% with the luminance set value Lset at the maximum luminance set value Lsetmax, and the video amplitude rate AMR decreases as the luminance set value Lset nears the first threshold Lth1 (AMR≥80%). In the second range, the video amplitude rate AMR is 100% with the luminance set value Lset at the first threshold Lth1, and the video amplitude rate AMR decreases as the luminance set value Lset nears the second threshold Lth2 (AMR≥80%). In the third range, the video amplitude rate AMR is 100% with the luminance set value Lset at the second threshold Lth2, and the video amplitude rate AMR decreases as the luminance set value Lset nears the third threshold Lth3 (AMR≥80%). In the fourth range, the video amplitude rate AMR is 100% with the luminance set value Lset at the third threshold Lth3, the video amplitude rate AMR decreases as the luminance set value Lset nears the minimum luminance set value Lsetmin, and the video amplitude rate AMR reaches 80% at the minimum luminance set value Lsetmin (AMR≥80%).

A range for the video amplitude rate AMR is not limited to the above-described example.

In the comparative example illustrated in FIG. 7A, the potential Vini (initialization potential) of an initialization voltage signal VINI is set constant (for example, at 1.2 V). In this case, the attempt to obtain desired luminance using the luminance set value Lset results in an increase in black-insertion rate EMR particularly in the third range and in the fourth range as illustrated in FIG. 7A. Thus, switching between the emission period $P_{EM}$ and the non-emission period $P_{BL}$ and flickers attributable to the switching between the emission period $P_{EM}$ and the non-emission period $P_{BL}$ are more likely to be visually recognized.

In the present embodiment, the initialization potential is changed in accordance with the luminance set value Lset as illustrated in FIG. 7C.

Specifically, the initialization potential is set to a first potential in the first range, the initialization potential is set to a second potential that is larger than the first potential in the second range, the initialization potential is set to a third potential that is larger than the second potential in the third range, and the initialization potential is set to a fourth potential that is larger than the third potential in the fourth range.

FIG. 7C illustrates an example in which: the first potential is set to 1.2 V; the second potential is set to 1.5 V; the third potential is set to 1.8 V; and the fourth potential is set to 2.1 V.

In this manner, as illustrated in FIG. 7D, the black-insertion rates EMR in the respective ranges that are the second range, the third range, and the fourth range can be set smaller than those for the comparative example illustrated FIG. 7A. Setting a higher value as the initialization potential makes it possible to, as illustrated in FIG. 7B, use the video amplitude rate AMR up to 100% even when the luminance set value Lset is small. Therefore, even when the luminance set value Lset is small, the display device 30 according to the present embodiment can reduce the possibility that switching between the emission period $P_{EM}$ and the non-emission period $P_{BL}$ and flickers attributable to the switching between the emission period $P_{EM}$ and the non-emission period $P_{BL}$ are visually recognized.

Figures 8, 9:
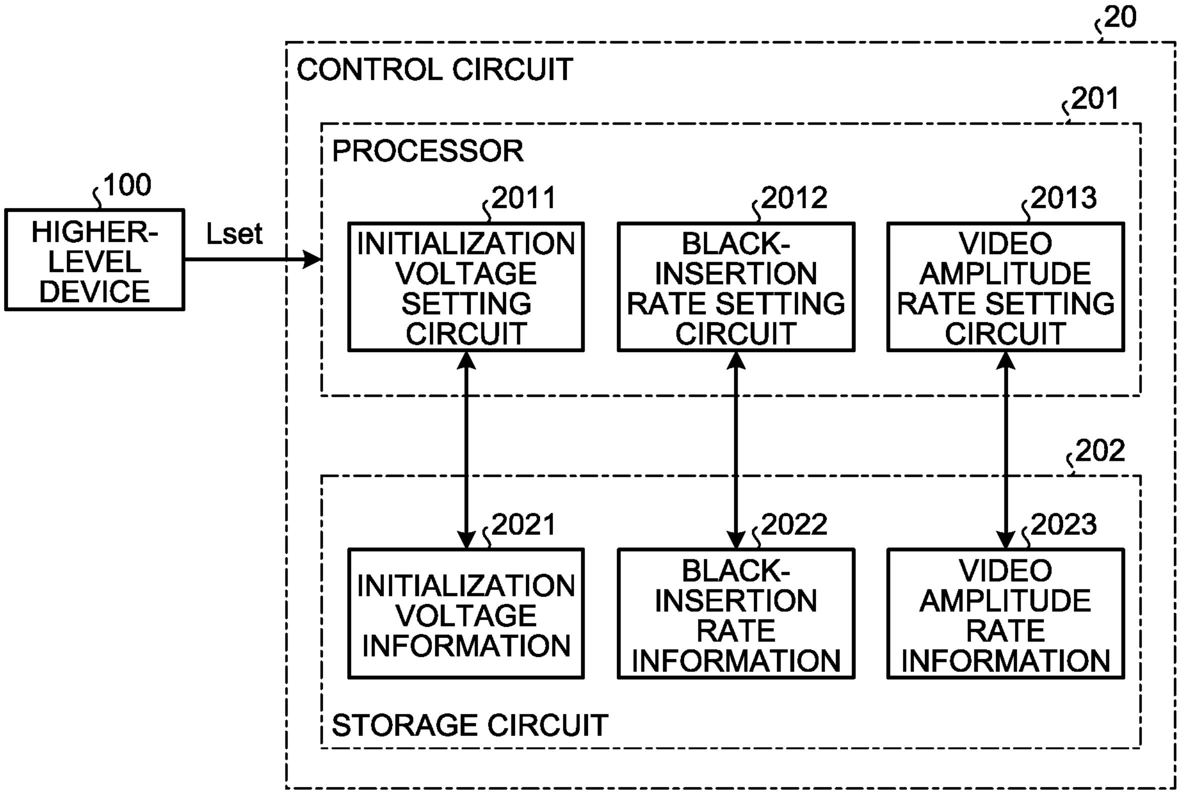
FIG. 8 is a diagram illustrating an example of the block configuration of the control circuit in the display device according to the first embodiment.
FIG. 9 is a diagram illustrating an example of initialization voltage information stored in a storage circuit.

FIG. 8 is a diagram illustrating an example of the block configuration of the control circuit in the display device according to the first embodiment. As illustrated in FIG. 8, the control circuit 20 includes a processor 201 and a storage circuit 202. The luminance-setting information is input to the processor 201 from the higher-level device 100. The luminance-setting information includes a luminance set value Lset.

The processor 201 includes an initialization voltage setting circuit 2011, a black-insertion rate setting circuit 2012, and a video amplitude rate setting circuit 2013.

FIG. 9 is a diagram illustrating an example of initialization voltage information stored in the storage circuit. FIG. 10 is a diagram illustrating an example of black-insertion rate information stored in the storage circuit. FIG. 11 is a diagram illustrating an example of video amplitude rate information stored in the storage circuit.

The storage circuit 202 has initialization voltage information 2021 previously stored therein in which set values (Vini set values) for the initialization potential are set corresponding to different luminance set values Lset. In the present embodiment, these set values are set in a manner such that a smaller luminance set value Lset corresponds to a higher set value (Vini set value) for the initialization potential, that is, corresponds to a larger potential difference between the source and the gate of the drive transistor 92. The storage circuit 202 also has black-insertion rate information 2022 previously stored therein in which set values (black-insertion rate set values) for the black-insertion rate EMR are set corresponding to different luminance set values Lset. In the present embodiment, these set values are set in a manner such that a smaller luminance set values Lset corresponds to a higher set value (black-insertion rate set value) for the black-insertion rate EMR. The storage circuit 202 also has video amplitude rate information 2023 previously stored therein in which set values (video amplitude rate set values) for the video amplitude rate AMR are set corresponding to different luminance set values Lset. The Vini set values contained in the initialization voltage information 2021, the black-insertion rate set values contained in the black-insertion rate information 2022, and the video amplitude rate set values contained in the video amplitude rate information 2023 may be numeric data or may be discrete values such as digital data.

Based on the luminance-setting information input to the processor 201 from the higher-level device 100, the initialization voltage setting circuit 2011 reads out, from the initialization voltage information 2021, the initialization potential set value that corresponds to the luminance set value Lset.

In the example illustrated in FIG. 9, the initialization voltage setting circuit 2011 determines whether the luminance set value Lset falls within the first range that satisfies Lsetmax≥Lset>Lth1, the second range that satisfies Lth1≥Lset>Lth2, the third range that satisfies Lth2≥Lset>Lth3, or the fourth range that satisfies Lth3≥Lset≥Lsetmin, and reads out the initialization potential set value that corresponds to the set range to which the luminance set value Lset belongs.

Based on the luminance-setting information input to the processor 201 from the higher-level device 100, the black-insertion rate setting circuit 2012 reads out, from the black-insertion rate information 2022, the black-insertion rate EMR that corresponds to the luminance set value Lset.

In the example illustrated in FIG. 10, the black-insertion rate setting circuit 2012 determines whether the luminance set value Lset falls within the first range that satisfies Lsetmax≥Lset>Lth1, the second range that satisfies Lth1≥Lset>Lth2, the third range that satisfies Lth2≥Lset>Lth3, or the fourth range that satisfies Lth3≥Lset≥Lsetmin, and reads out the black-insertion rate that corresponds to the set range to which the luminance set value Lset belongs.

Based on the luminance-setting information input to the processor 201 from the higher-level device 100, the video amplitude rate setting circuit 2013 reads out, from the video amplitude rate information 2023, the video amplitude rate set value that corresponds to the luminance set value Lset.

In the example illustrated in FIG. 11, the video amplitude rate setting circuit 2013 is configured such that, in the first range that satisfies Lsetmax≥Lset>Lth1, "AMR=100[%]" at the maximum luminance set value Lsetmax, and the video amplitude rate AMR decreases as the luminance set value Lset nears the first threshold Lth1 (AMR≥80%). In the second range that satisfies Lth1≥Lset>Lth2, "AMR=100[%]" at the first threshold Lth1, and the video amplitude rate AMR decreases as the luminance set value Lset nears the second threshold Lth2 (AMR≥80%). In the third range that satisfies Lth2≥Lset>Lth3, "AMR=100[%]" at the second threshold Lth2, and the video amplitude rate AMR decreases as the luminance set value Lset nears the third threshold Lth3 (AMR≥80%). In the fourth range that satisfies Lth3≥Lset Lsetmin, "AMR=100[%]" at the third threshold Lth3, the video amplitude rate AMR decreases as the luminance set value Lset nears the minimum luminance set value Lsetmin, and "AMR=80[%]" at the minimum luminance set value Lsetmin.

The processor 201 outputs the initialization potential set value, the black-insertion rate set value, and the video amplitude rate set value that have been read out thereby to the video line drive circuit 54 and the scan line drive circuit 52.

Based on the initialization potential input from the processor 201, the video line drive circuit 54 generates an initialization voltage signal VINI to be supplied to the initialization signal line (second signal line) 110.

Based on the video amplitude rate set value input from the processor 201, the video line drive circuit 54 generates a video voltage signal VSIG to be supplied to the video signal line (first signal line) 72.

Based on the black-insertion rate set value input from the processor 201, the scan line drive circuit 52 generates an emission control signal CG to be supplied to the emission control line 79.

The control circuit 20 then performs the above-described writing operation. In this manner, even when the luminance set value Lset input from the higher-level device 100 is small, the possibility that switching between the emission period $P_{EM}$ and the non-emission period $P_{BL}$ and flickers attributable to the switching between the emission period $P_{EM}$ and the non-emission period $P_{BL}$ are visually recognized can be reduced.

The processor 201 and the storage circuit 202 may be included in the controller 56 or may be included in the video line drive circuit 54. The processor 201 and the storage circuit 202 may alternatively be provided to a component other than the controller 56 and the video line drive circuit 54. The present disclosure is not limited in terms of which component the processor 201 and the storage circuit 202 are provided to.

Modification

Figure 12:
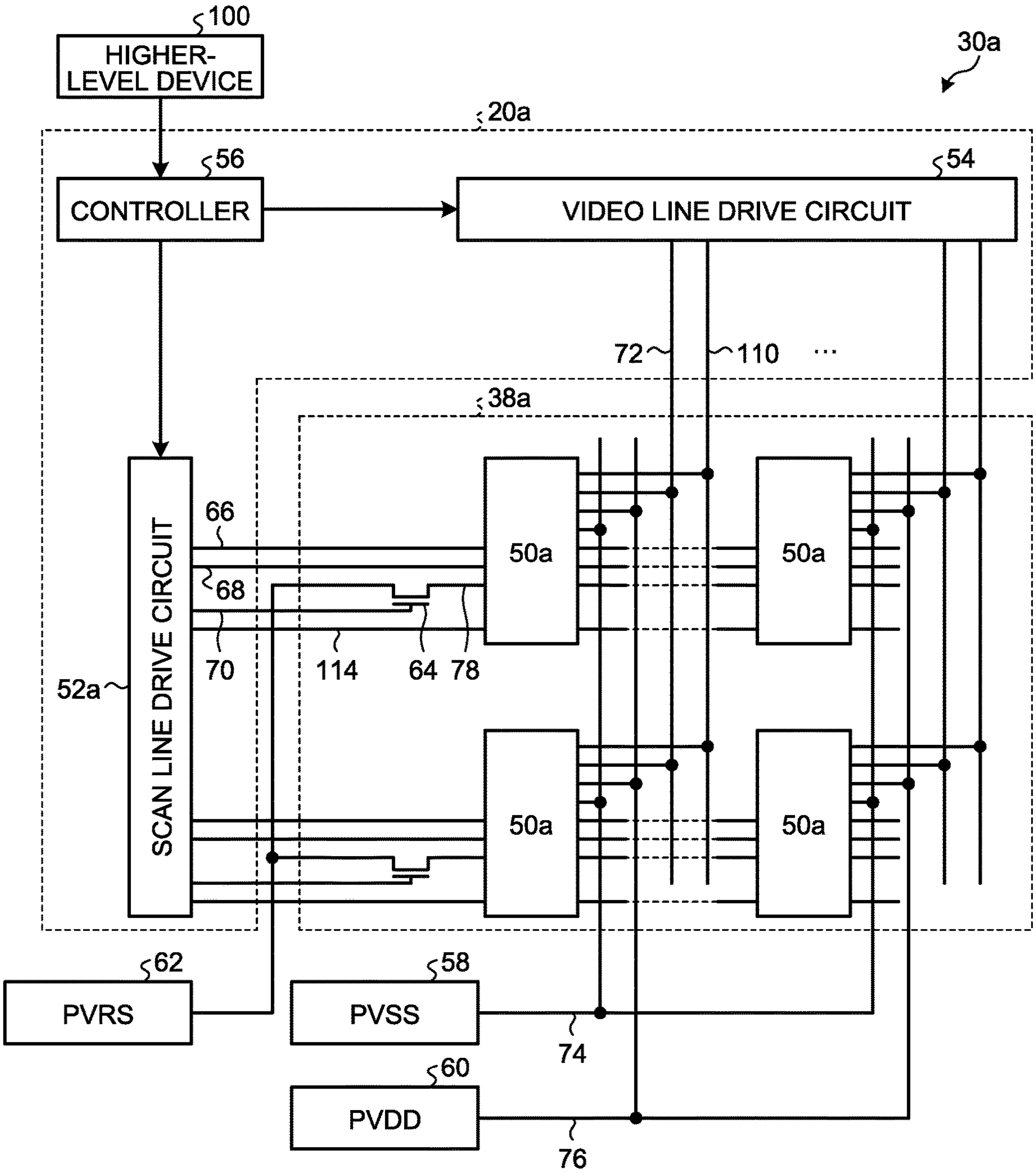
FIG. 12 is a schematic circuit diagram illustrating schematic configurations of a display area and a control circuit in a display device according to a modification of the first embodiment.
Figure 13:
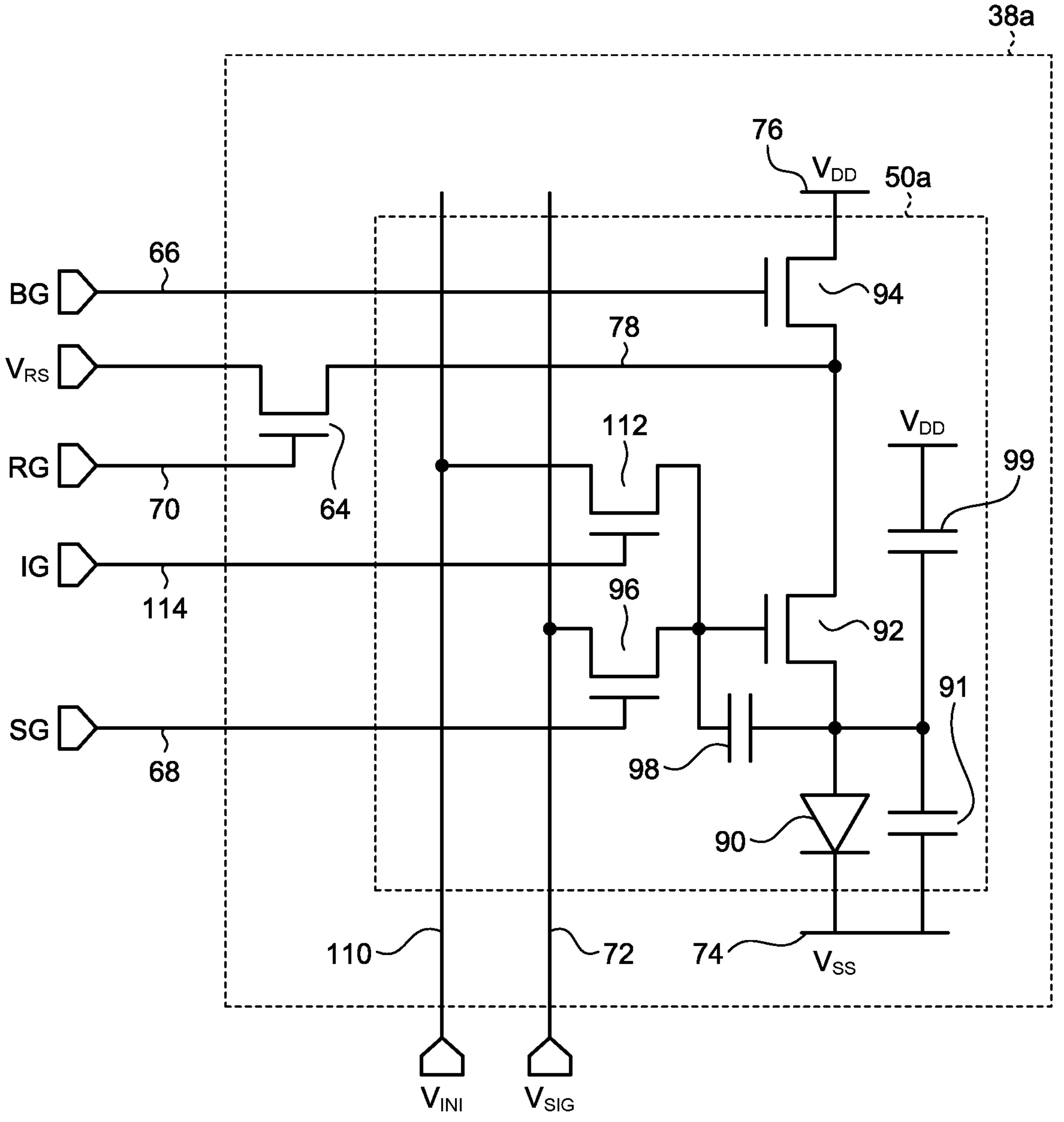
FIG. 13 is an example of a schematic equivalent circuit diagram of a pixel arranged in the display area illustrated in FIG. 12.
Figure 14:
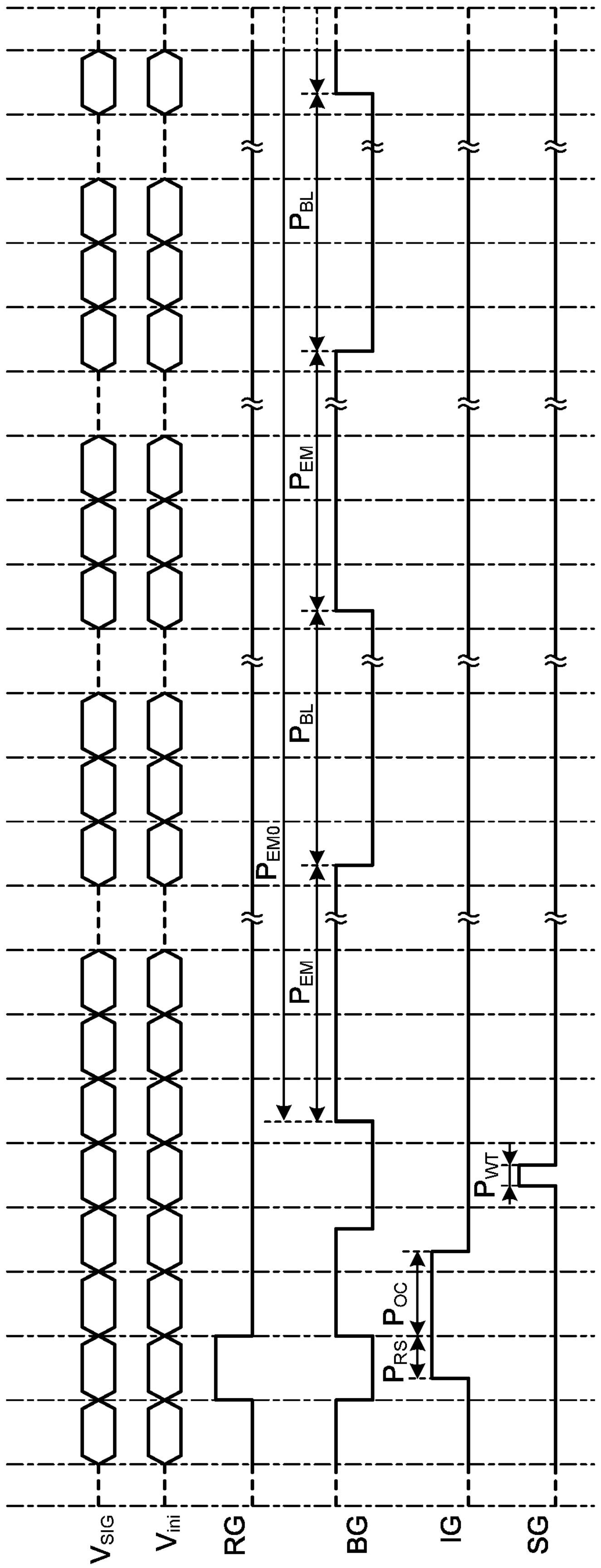
FIG. 14 is a schematic timing chart for explaining a driving method for the display device according to the modification of the first embodiment.

FIG. 12 is a schematic circuit diagram illustrating schematic configurations of a display area and a control circuit in a display device according to a modification of the first embodiment. FIG. 13 is an example of a schematic equivalent circuit diagram of a pixel arranged in the display area illustrated in FIG. 12. As with FIG. 4, FIG. 13 illustrates changes of various signals in the writing operation of pixel values and the emission operation in one pixel row of a display area 38*a*. FIG. 14 is a schematic timing chart for explaining a driving method for the display device according to the modification of the first embodiment.

A display device 30*a* according to the modification of the first embodiment has a configuration different from the configuration illustrated in FIG. 2 and FIG. 3 in that, while the lighting control lines 66 extending to the pixel columns from a scan line drive circuit 52*a* of a control circuit 20*a* double as the respective emission control lines 79 illustrated in FIG. 2 and FIG. 3, each pixel 50*a* has the lighting switch (shut-off transistor) 94 doubling as the emission control switch 97 illustrated in FIG. 3. The writing operation in the configuration illustrated in FIG. 12 and FIG. 13 is described with reference to FIG. 14. This description focuses on differences from the schematic timing chart illustrated in FIG. 4.

After the offset cancelling operation, the lighting control signal BG is set to the L level, so that the lighting switch 94 is turned off and that a current is stopped from flowing into the drive transistor 92 from the drive power supply PVDD. In this state, when the writing switch 96 is turned on by setting the writing control signal SG to the H level while the potential Vsig (video writing potential) of the video voltage signal VSIG is supplied to each of the video signal lines (first signal lines) 72, the gate potential of the drive transistor 92 rises to a potential corresponding to the potential Vsig (video writing potential) of the video voltage signal VSIG from a potential corresponding to the potential Vini (initialization potential) of the initialization voltage signal VINI.

Thereafter, when the video signal setting operation is ended by turning off the writing switch 96, an emission-enabled period $P_{EM0}$ is entered in which the organic light-emitting diode 90 can emit light. In this emission-enabled period $P_{EM0}$, when the lighting switch 94 is turned on by setting the lighting control signal BG to the H level, the organic light-emitting diode 90 emits light with an intensity corresponding to the potential Vsig (video writing potential) of the video voltage signal VSIG.

In the emission-enabled period $P_{EM0}$ for each pixel row, for the emission period $P_{EM}$, the lighting switch 94 is turned on by setting the lighting control signal BG to the H level, so that a forward-direction current is supplied to the organic light-emitting diode 90 from the drive power supply PVDD. For the non-emission period $P_{BL}$, the lighting switch 94 is turned off by setting the lighting control signal BG to the L level, so that the drive power supply PVDD and the drive transistor 92 maintained conductive are decoupled from each other, whereby the forward-direction current (drive current) is forced to stop being supplied to the organic light-emitting diode 90.

As described above, the display devices 30 and 30*a* according to the first embodiment include the respective display areas 38 and 38*a*, each of which has the multiple pixels 50 or 50*a* arranged in the X direction (first direction) and the Y direction (second direction), and the respective control circuits 20 and 20*a*. Each of the pixels 50 and 50*a* includes a light-emitting element (the organic light-emitting diode 90), which emits light with a current flowing therethrough, the drive transistor 92, the shut-off transistors (the lighting switch 94 and the emission control switch 97), and the holding capacitance 98. One of the terminals (the anode) of the light-emitting element (organic light-emitting diode 90) is coupled to one of the source and the drain of the drive transistor 92. In the first embodiment, the light-emitting element is coupled to the source of the Nch-type drive transistor 92. A first potential (the reference potential $V_{SS}$) is supplied to the other terminal (the cathode) of the light-emitting element (organic light-emitting diode 90). A second potential (the drive potential $V_{DD}$), which is higher than the first potential (reference potential $V_{SS}$), is supplied to the other one of the source and the drain of the drive transistor 92 via the shut-off transistors (the lighting switch 94 and the emission control switch 97). In the first embodiment, the drive potential $V_{DD}$ is supplied to the drain of the Nch-type drive transistor 92. The shut-off transistors (the lighting switch 94 and the emission control switch 97) supply or shut off the second potential (drive potential $V_{DD}$) to the drive transistor 92. The holding capacitance 98 is coupled between the source and the gate of the drive transistor 92. Each of the control circuits 20 and 20*a* supplies the second potential (drive potential $V_{DD}$) to the drive transistor 92 by controlling the shut-off transistors (the lighting switch 94 and the emission control switch 97) to have them on and writes an initialization potential (the potential Vini of an initialization voltage signal VINI) into the gate of the drive transistor 92. Thereafter, each of the control circuits 20 and 20*a* shuts off the supply of the second potential (drive potential $V_{DD}$) by controlling the shut-off transistor (the lighting switch 94 and the emission control switch 97) to have them off and writes a video writing potential (the potential Vsig of a video voltage signal VSIG) resulting from a video signal into the gate of the drive transistor 92. In this configuration, the control circuit 20, 20*a* sets the initialization potential (potential Vini of the initialization voltage signals VINI) in a manner such that, as the luminance set value Lset for the luminance of a video signal is smaller, the potential difference between the source and the gate of the drive transistor 92 is larger.

For each of the control circuits 20 and 20*a*, the emission period $P_{EM}$ for which the light-emitting element (organic light-emitting diode 90) is caused to emit light with an intensity corresponding to a video writing potential (the potential Vsig of the video writing potential VSIG) and the non-emission period $P_{BL}$ for which a current is forced to stop being supplied to the light-emitting element (organic light-emitting diode 90) are provided within the emission-enabled period $P_{EM0}$ of the light-emitting element (organic light-emitting diode 90) after the video writing potential (potential Vsig of the video voltage signal VSIG) is supplied to the gate of the drive transistor 92. For the emission period $P_{EM}$, each of the control circuits 20 and 20*a* controls the shut-off transistors (the lighting switch 94 and the emission control switch 97) to have them on and thereby supplies the second potential (drive potential $V_{DD}$); and for the non-emission period $P_{BL}$, each of the control circuits 20 and 20*a* controls the shut-off transistors (the lighting switch 94 and the emission control switch 97) to have them off and thereby shuts off the supply of the second potential (drive potential $V_{DD}$). In this configuration, a larger value is set as the proportion of the non-emission period $P_{BL}$ to the emission-enabled period $P_{EM0}$ as the luminance set value Lset is smaller.

Specifically, for each of the control circuits 20 and 20*a*, a threshold (the first threshold Lth1, the second threshold Lth2, or the third threshold Lth3) is set for the luminance set value Lset. Each of the control circuits 20 and 20*a* sets an initialization potential (the potential Vini of an initialization voltage signal VINI) in a manner such that a second potential difference between the source and the gate of the drive transistor 92 exceeds a first potential difference between the source and the gate of the drive transistor 92, the first potential difference being generated by the initialization potential (the potential Vini of the initialization voltage signal VINI) to be written into the gate of the drive transistor 92 when the luminance set value Lset is larger than the threshold (the first threshold Lth1, the second threshold Lth2, or the third threshold Lth3), the second potential difference being generated by the initialization potential (the potential Vini of the initialization voltage signal VINI) to be written into the gate of the drive transistor 92 is not larger when the luminance set value Lset is not larger than the threshold (the first threshold Lth1, the second threshold Lth2, or the third threshold Lth3).

Each of the control circuits 20 and 20*a* performs control such that the proportion (black-insertion rate) of the non-emission period $P_{BL}$ to the emission-enabled period $P_{EM0}$ to be applied when the luminance set value Lset is not larger than the threshold (the first threshold Lth1, the second threshold Lth2, or the third threshold Lth3) surpasses the proportion (black-insertion rate) of the non-emission period $P_{BL}$ to the emission-enabled period $P_{EM0}$ to be applied when the luminance set value Lset is larger than the threshold (the first threshold Lth1, the second threshold Lth2, or the third threshold Lth3).

Specifically, a plurality of set ranges (the first range, the second range, the third range, and the fourth range) partitioned by a plurality of thresholds (the first threshold Lth1, the second threshold Lth2, and the third threshold Lth3) are provided for each of the control circuits 20 and 20*a* to be applied to the luminance set value Lset, and the initialization potential (the potential Vini of the initialization voltage signal VINI) to be written into the gate of the drive transistor 92 of a corresponding one of the pixels 50 and 50*a* is set to different values in the respective set ranges (the first range, the second range, the third range, and the fourth range).

Specifically, the proportion (black-insertion rate) of the non-emission period $P_{BL}$ to the emission-enabled period $P_{EM0}$ is also set to different values in the respective set ranges (the first range, the second range, the third range, and the fourth range).

Each of the control circuits 20 and 20*a* sets a smaller value as the proportion (video amplitude rate) of the amplitude of a video writing potential (the potential Vsig of a video voltage signal VSIG) after the reflection of the luminance set value Lset to the amplitude of the video writing potential (the potential Vsig of the video voltage signal VSIG) before the reflection of the luminance set value Lset as the luminance set value Lset is smaller within each of the set ranges (the first range, the second range, the third range, and the fourth range).

In this manner, even when the luminance set value Lset input from the higher-level device 100 is small, the display devices 30 and 30*a* according to the first embodiment can reduce the possibility that switching between the emission period $P_{EM}$ and the non-emission period $P_{BL}$ and flickers attributable to the switching between the emission period $P_{EM}$ and the non-emission period $P_{BL}$ are visually recognized, and can suppress display quality degradation even under a condition of being set to low luminance.

Second Embodiment

The following describes a display device according to a second embodiment with a focus on differences thereof with the first embodiment while assigning the same reference signs to components thereof that have the same functions as those in the first embodiment described above and omitting descriptions of the components.

Figure 15:
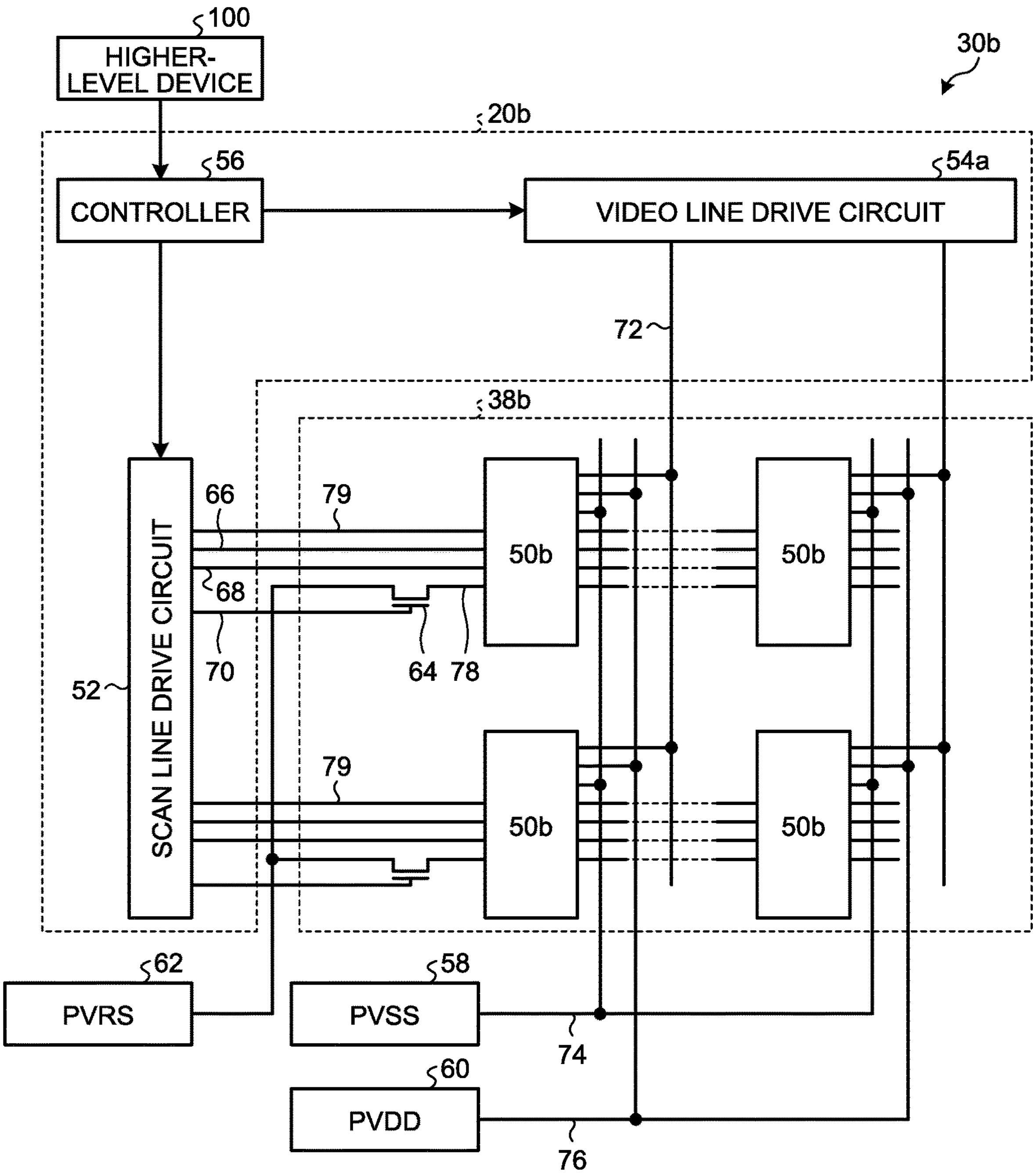
FIG. 15 is a schematic circuit diagram illustrating a schematic configuration of a display area and a control circuit of a display device according to a second embodiment.
Figure 16:
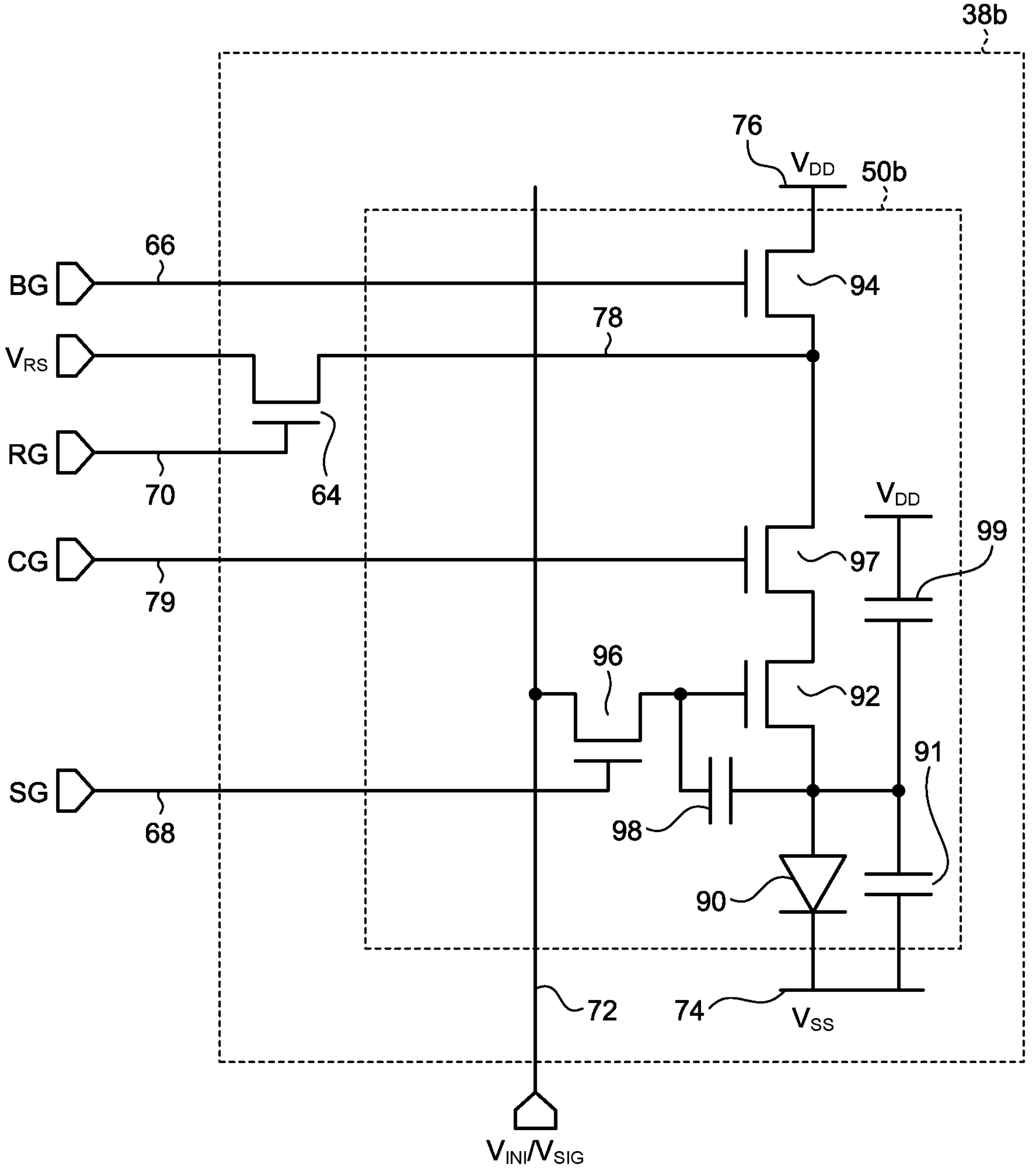
FIG. 16 is an example of a schematic equivalent circuit diagram of a pixel arranged in the display area illustrated in FIG. 15.
Figure 17:
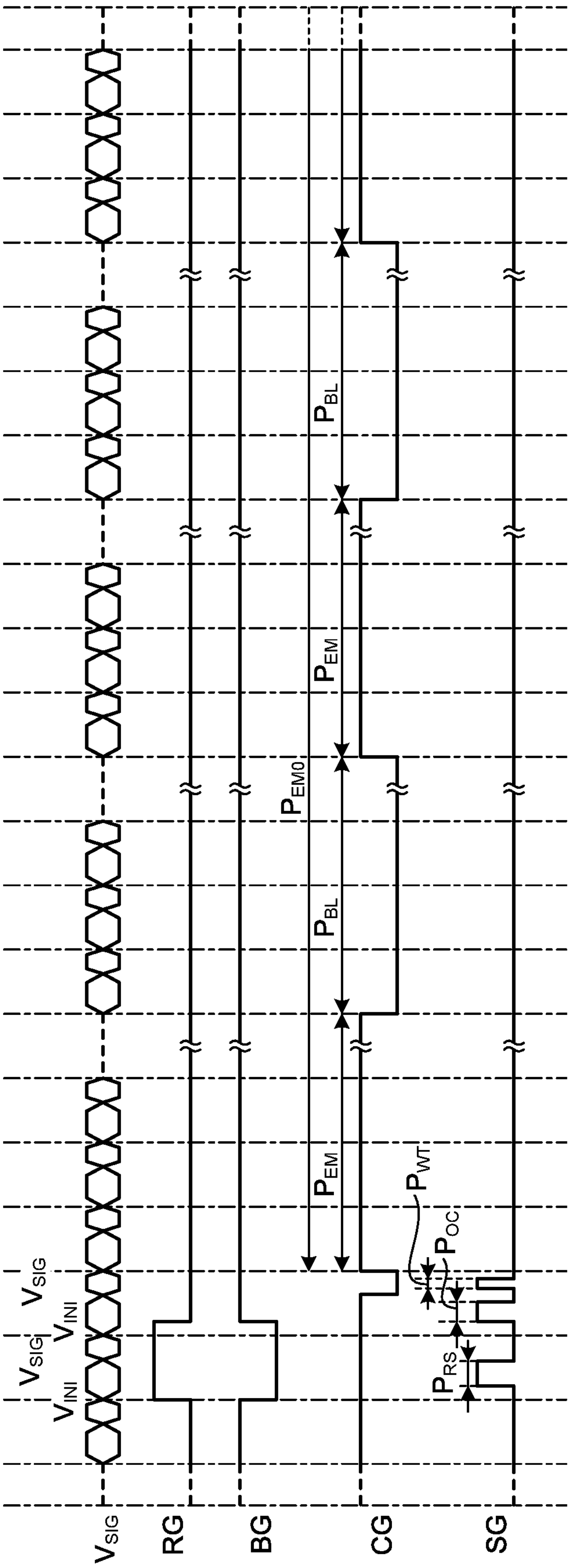
FIG. 17 is a schematic timing chart for explaining a driving method for the display device according to the second embodiment.

FIG. 15 is a schematic circuit diagram illustrating schematic configurations of a display area and a control circuit in the display device according to the second embodiment. FIG. 16 is an example of a schematic equivalent circuit diagram of a pixel arranged in the display area illustrated in FIG. 15. As with FIG. 4, FIG. 16 illustrates changes of various signals in the writing operation of pixel values and the emission operation in one pixel row of a display area 38*b*. FIG. 17 is a schematic timing chart for explaining a driving method for the display device according to the second embodiment.

A display device 30*b* illustrated in FIG. 15 according to the second embodiment is different from the first embodiment illustrated in FIG. 2 in that a video voltage signal VSIG and an initialization voltage signal VINI to be supplied to each of the pixel columns from a control circuit 20*b* of a video line drive circuit 54*a* are supplied in the same line, that is, the video signal line (first signal line) 72. Specifically, the video signal lines (first signal lines) 72 that supply video voltage signals VSIG and initialization voltage signals VINI are wired to pixels 50*b*.

In the reset operation, the display device 30*b* according to the second embodiment turns off the lighting switch (the first shut-off transistor) 94 by setting the lighting control signal BG to the L level, turns on the reset switch 64 by setting the reset control signal RG to the H level, and further, turns on the writing switch 96 by setting the writing control signal SG to the H level with the potentials Vini (initialization potentials) of the initialization voltage signals VINI applied to the respective video signal lines (first signal lines) 72.

As a result, the gate potential of each of the drive transistors 92 is reset to a potential corresponding to the potential Vini (initialization potential) of the initialization voltage signal VINI. With the drive transistor 92 set conductive as a result, the source potential of the drive transistor 92 is reset to a potential corresponding to the reset potential $V_{RS}$, and the terminal-to-terminal voltage of the holding capacitance 98 of each pixel 50*b* is set to a voltage corresponding to (Vini−$V_{RS}$).

In the offset cancelling operation, the display device 30*b* according to the second embodiment turns off the reset switch 64 by setting the reset control signal RG to the L level, turns on the writing switch 96 and the lighting switch 94 by setting the writing control signal SG and the lighting control signal BG to the H level, and applies the potential Vini (initialization potential) of the initialization voltage signal VINI to each of the video signal lines (first signal lines) 72. During this operation, the emission control line 79 is maintained at the H level, whereby the emission control switch (second shut-off transistor) 97 is on.

As a result, the gate potential of the drive transistor 92 is fixed at a potential corresponding to the potential Vini (initialization potential) of the initialization voltage signal VINI.

In the video signal setting period $P_{WT}$ during the video signal setting operation, the display device 30*b* according to the second embodiment has the reset control signal RG maintained at the L level and the lighting control signal BG maintained at the H level continuously from the offset cancelling period $P_{OC}$. After the offset cancelling operation is ended, the emission control signal CG is set to the L level, so that the emission control switch 97 is turned off and that a current is stopped from flowing into the drive transistor 92 from the drive power supply PVDD. The writing switch 96 is then turned off temporarily, and the potentials Vsig (video writing potential) of video voltage signals VSIG are supplied to the respective video signal lines (first signal lines) 72. Accordingly, the writing switch 96 is turned on by setting the writing control signal SG to the H level, so that the gate potential of the drive transistor 92 rises to a potential corresponding to the potential Vsig (video writing potential) of the video voltage signal VSIG from a potential corresponding to the potential Vini (initialization potential) of the initialization voltage signal VINI.

When the video signal setting operation is ended by turning off of the writing switch 96, an emission-enabled period $P_{EM0}$ is entered in which the organic light-emitting diode 90 can emit light. In this emission-enabled period $P_{EM0}$, when the emission control switch 97 is turned on by setting the emission control signal CG to the H level, the organic light-emitting diode 90 emits light with an intensity corresponding to the potential Vsig (video writing potential) of the video voltage signal VSIG. That is, even after the writing switch 96 is turned off, the drive transistor 92 that has become conductive in the video signal setting operation is maintained conductive by the voltage held by the holding capacitance 98, and a drive current corresponding to the potential Vsig (video writing potential) of the video voltage signal VSIG is supplied to the organic light-emitting diode 90. As a result, the organic light-emitting diode 90 emits light with luminance corresponding to the potential Vsig (video writing potential) of the video voltage signal VSIG.

The above-described writing operation (the reset operation, the offset cancelling operation, and the video signal setting operation) and emission operation are sequentially performed with respect to each pixel row included in the display area 38*b* as in the first embodiment. The pixel rows are sequentially selected, for example, in cycles of one horizontal scan period of a video signal, and the writing operation and the emission operation for each pixel row are repeated in cycles of one frame period. In the example illustrated in FIG. 15, for the video line drive circuit 54*a*, a period ($V_{INI}$ period) for which the potentials Vini (initialization potentials) of the initialization voltage signals VINI are applied to the video signal lines (first signal lines) 72 and a period ($V_{SIG}$ period) for which the potentials Vsig (video writing potentials) of the video voltage signals VSIG are applied thereto are each provided once in every horizontal scan period. That is, to the video signal lines (first signal lines) 72, the period ($V_{INI}$ period) for which the potentials Vini (initialization potentials) of the initialization voltage signals VINI are applied to the video signal lines (first signal lines) 72 and the period ($V_{SIG}$ period) for which the potentials Vsig (video writing potentials) of the video voltage signals VSIG are applied thereto are provided in a time-divisional manner within each horizontal scan period.

Modification

Figure 18:
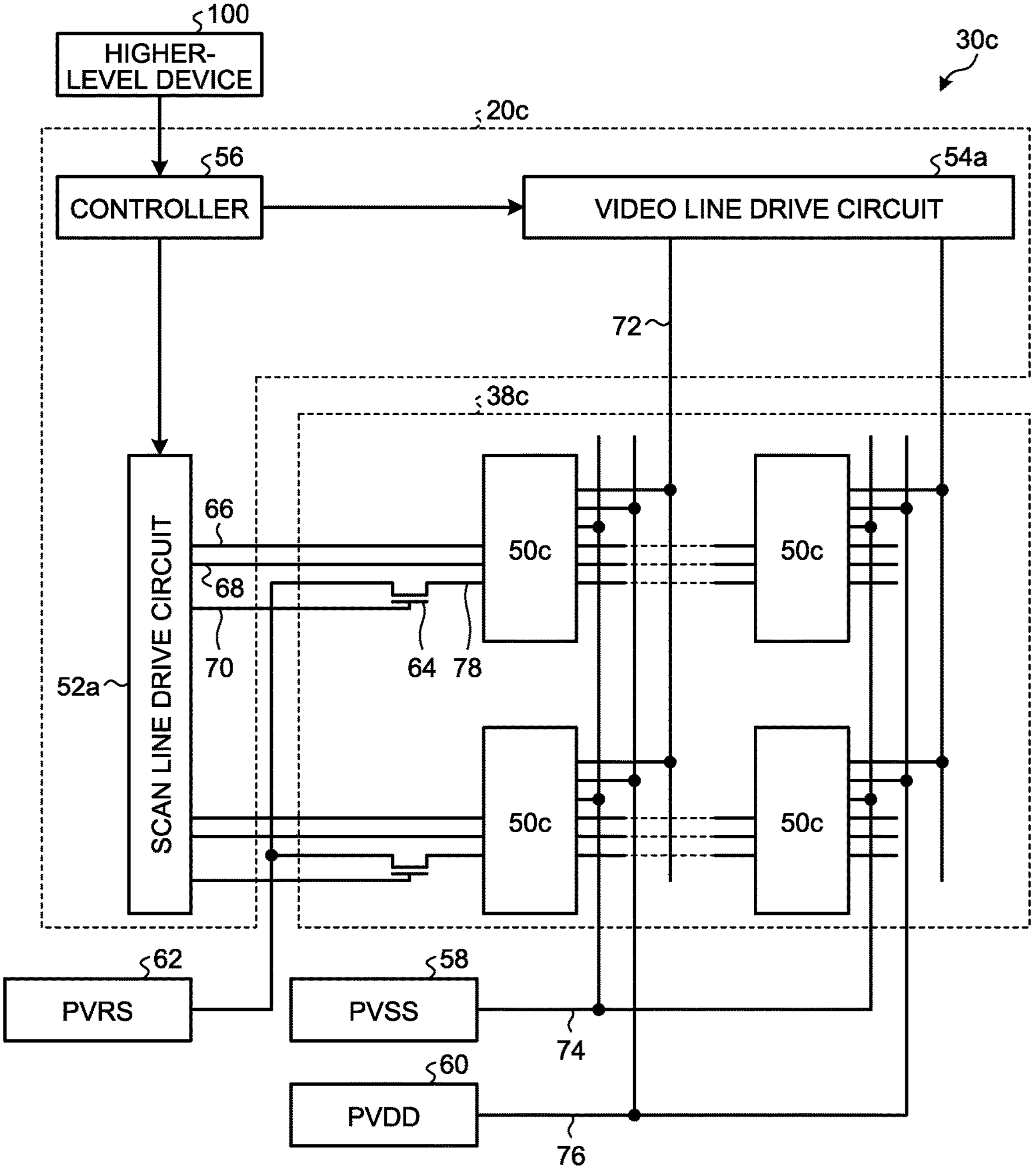
FIG. 18 is a schematic circuit diagram illustrating schematic configurations of the display area and a control circuit in the display device according to a modification of the second embodiment.
Figure 19:
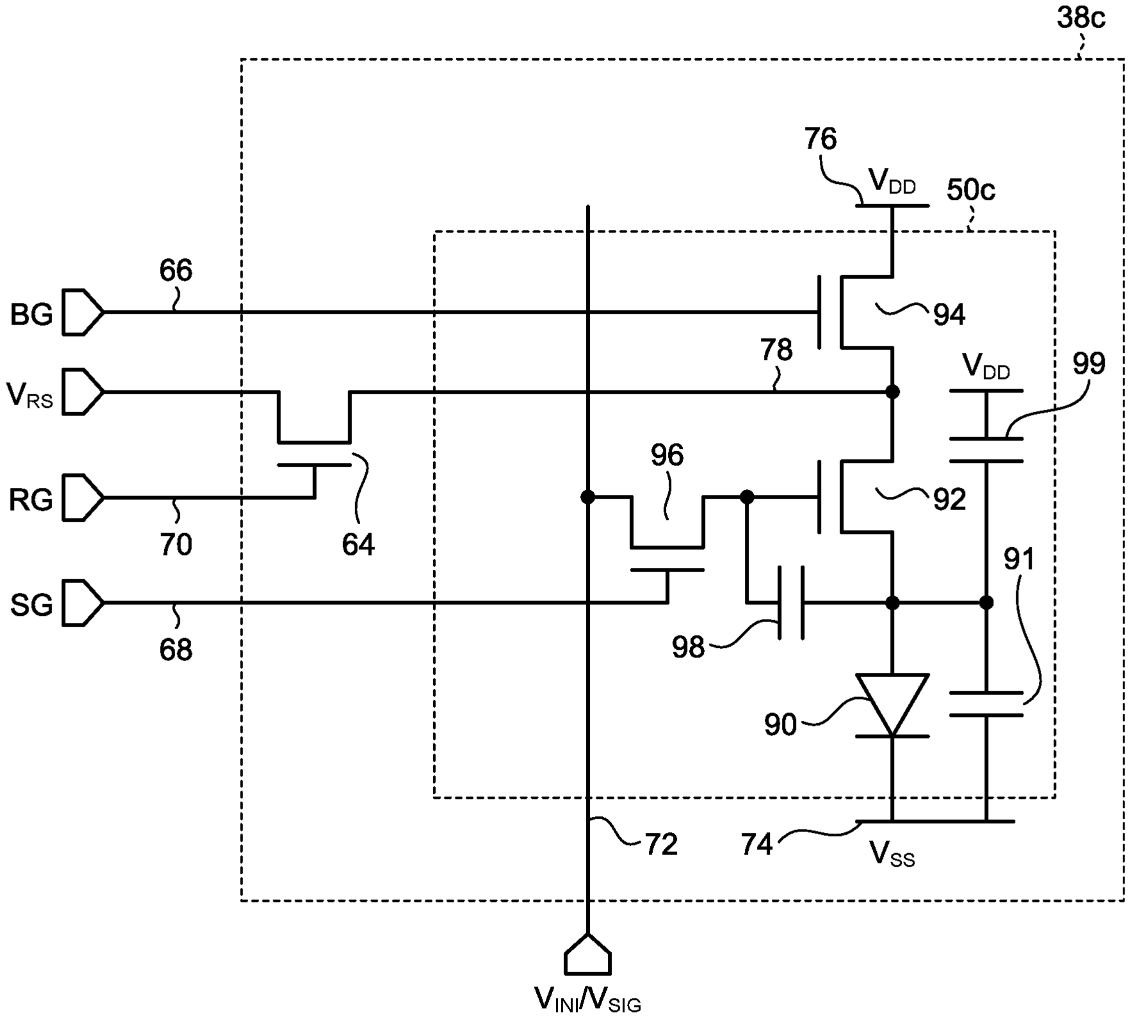
FIG. 19 is an example of a schematic equivalent circuit diagram of a pixel arranged in the display area illustrated in FIG. 18.
Figure 20:
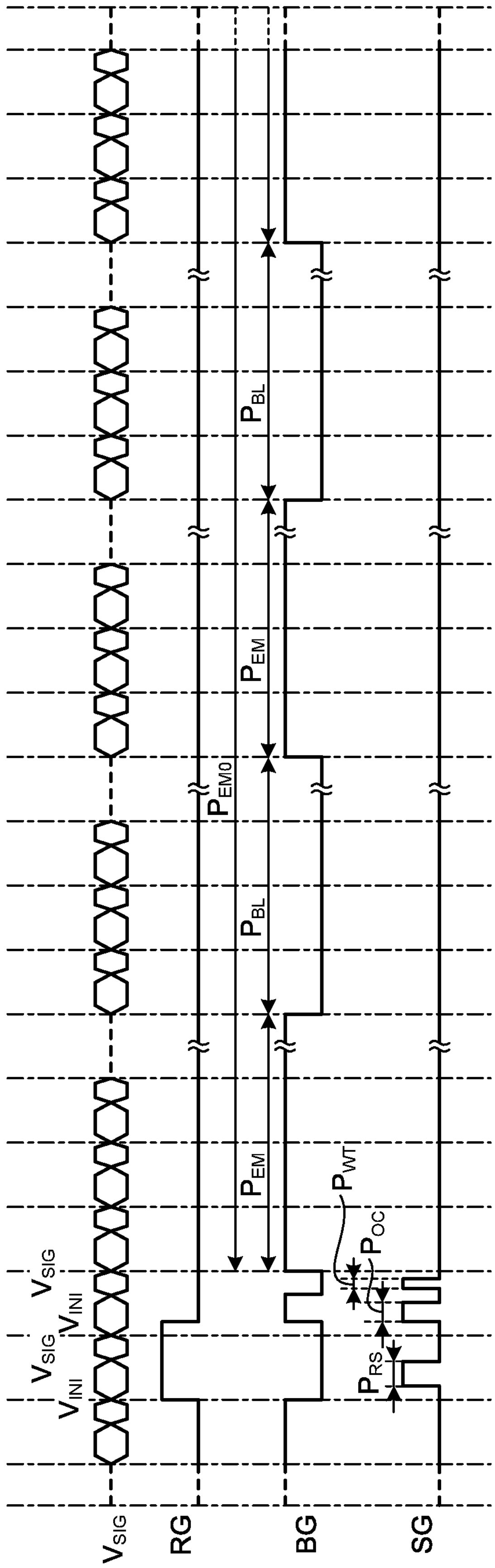
FIG. 20 is a schematic timing chart for explaining a driving method for the display device according to the modification of the second embodiment.

FIG. 18 is a schematic circuit diagram illustrating schematic configurations of a display area and a control circuit in a display device according to a modification of the second embodiment. FIG. 19 is an example of a schematic equivalent circuit diagram of a pixel arranged in the display area illustrated in FIG. 18. As with FIG. 4, FIG. 19 illustrates changes of various signals in the writing operation of pixel values and the emission operation in one pixel row of a display area 38*c*. FIG. 20 is a schematic timing chart for explaining a driving method for the display device according to the modification of the second embodiment.

A display device 30*c* according to the modification of the second embodiment has a configuration different from the configuration illustrated in FIG. 15 and FIG. 16 in that, while the lighting control lines 66 extending to the pixel columns from the scan line drive circuit 52*a* of a control circuit 20*c* double as the respective emission control lines 79 illustrated in FIG. 15 and FIG. 16, each pixel 50*c* has the lighting switch (shut-off transistor) 94 doubling as the emission control switch 97 illustrated in FIG. 16. The writing operation in the configuration illustrated in FIG. 18 and FIG. 19 is described with reference to FIG. 20. This description focuses on differences from the schematic timing chart illustrated in FIG. 17.

After the offset cancelling operation, the lighting control signal BG is set to the L level, so that the lighting switch 94 is turned off and that a current is stopped from flowing into the drive transistor 92 from the drive power supply PVDD. The writing switch 96 is then turned off temporarily, and the potentials Vsig (video writing potential) of video voltage signals VSIG are supplied to the respective video signal lines (first signal lines) 72. In this state, the writing switch 96 is turned on by setting the writing control signal SG to the H level, so that the gate potential of the drive transistor 92 rises to a potential corresponding to the potential Vsig (video writing potential) of the video voltage signal VSIG from a potential corresponding to the potential Vini (initialization potential) of the initialization voltage signal VINI.

Thereafter, when the video signal setting operation is ended by turning off the writing switch 96, an emission-enabled period $P_{EM0}$ is entered in which the organic light-emitting diode 90 can emit light. In this emission-enabled period $P_{EM0}$, when the lighting switch 94 is turned on by setting the lighting control signal BG to the H level, the organic light-emitting diode 90 emits light with an intensity corresponding to the potential Vsig (video writing potential) of the video voltage signal VSIG.

In the emission-enabled period $P_{EM0}$ for each pixel row, for the emission period $P_{EM}$, the lighting switch 94 is turned on by setting the lighting control signal BG to the H level, so that a forward-direction current (drive current) is supplied to the organic light-emitting diode 90 from the drive current PVDD. For the non-emission period $P_{BL}$, the lighting switch 94 is turned off by setting the lighting control signal BG to the L level, so that the drive power supply PVDD and the drive transistor 92 maintained conductive are decoupled from each other, whereby the forward-direction current (drive current) is forced to stop being supplied to the organic light-emitting diode 90.

While a configuration such that the potential Vini (initialization potential) of an initialization voltage signal VINI is changed in accordance with the luminance set value Lset has been described in the above-described embodiments, an aspect such that a drive potential $V_{DD}$ is changed in accordance with the luminance set value Lset may be incorporated into the configuration.

While examples in which the initialization potential and the black-insertion rate are changed in accordance with the luminance set value Lset have been presented in the above-described embodiments, a configuration such that the initialization potential is changed without black insertion performed may be employed instead.

While a configuration such that each pixel row is provided with one of the reset lines 78 and one of the reset switches 64 has been described in the above-described embodiments, another configuration such that each of the pixels 50, 50*a*, 50*b*, or 50*c* is provided with one of the reset switches 64 may be employed instead. In that case, a configuration such that two or more pixels 50, 50*a*, 50*b*, or 50*c* included in each pixel row share one of the reset control lines 70 may be employed, or a configuration such that each of the pixels 50, 50*a*, 50*b*, or 50*c* is provided with one of the reset control lines 70 may be employed.

As described above, in each of the embodiments, a plurality of pixels 50, 50*a*, 50*b*, or 50*c* included in each pixel row share one of the reset lines 78 and one of the reset switches 64. Alternatively, a configuration such that, with each of the pixel rows separated into a plurality of sections, each section shares one of the reset lines 78 and one of the reset switches 64 may be employed.

Otherwise, a configuration such that each two or more of the pixel rows share one of the reset switches 64 may be employed. In this configuration, each of the pixel rows is provided with one of the reset lines 78, and one of the reset switches 64 that is common to each two or more of the reset lines 78 switches between coupling and decoupling thereof to and from the reset power supply PVRS.

Another layout in which a relatively small number of pixel rows, such as two adjacent pixel rows, share one of the reset lines 78 may be employed, for example. Specifically, each of the reset lines 78 is formed of a trunk part extending in the row direction and branch parts extending in the column direction in positions corresponding to the respective columns.

While a configuration such that the drive transistor 92 is formed of an n-type TFT is described in each of the above-described embodiments, an alternative configuration such that the drive transistor 92 is formed of a p-type TFT may be employed. Likewise, a configuration such that any of the lighting switch 94, the emission control switch 97, the reset switch 64, the writing switch 96, and the initialization switch 112 is formed of a p-type TFT instead of being formed of an n-type TFT as described in each of the above-described embodiments may be employed. That is, the circuit configurations illustrated in FIG. 3, FIG. 13, FIG. 16, and FIG. 19 described in the above-described embodiments are examples and may each be alternatively formed of any one of various circuits such as a circuit that includes p-type TFTs only and a circuit that includes both at least one p-type TFT and at least one n-type TFT.

According to each of the above-described embodiments, a display device that can suppress display quality degradation even under a condition of being set to low luminance can be provided.

Components from the above-described embodiments can be used in combination as appropriate. It should be naturally understood that the present disclosure produces other operation and effect that are produced by the aspects described in each of the present embodiments and that are obvious from the disclosure of the present description or can be conceived by the skilled person as appropriate.

What is claimed is:

1. A display device comprising:

a light-emitting element, a drive transistor coupled to the light-emitting element, a gate of the drive transistor is configured to receive an initialization voltage and a video voltage, and a shut-off circuit, coupled to the drive transistor, configured to supply or shut off a power voltage to the drive transistor, wherein, the shut-off circuit is configured to supply the power voltage to the drive transistor while the initialization voltage is written into the gate of the drive transistor, and then shut off the power voltage while the video voltage is written into the drive transistor, and then supply the power voltage in an emission-enabled period at a black insertion rate which is a ratio of a period in which the power voltage is shut off to a period of the emission-enabled period, a luminance set value corresponds to the black insertion rate and a voltage difference between the initialization voltage and the video voltage, as the luminance set value gets lower, the black insertion rate and the initialization voltage get higher, a gate-source voltage corresponds to the luminance set value, and the black insertion rate is based on the initialization voltage and the luminance set value, such that a difference in black insertion rate increases relative to a difference in the initialization voltage, as the luminance set value gets lower, and as the initialization voltage gets higher.

2. The display device according to claim 1, further comprising:

a control circuit configured to control the shut-off circuit.

3. The display device according to claim 2, wherein the control circuit includes a storage circuit configured to store therein initialization voltage information that has defined correspondence relations between a first initialization voltage and a second initialization voltage and a first luminance set value and a second luminance set value.

4. The display device according to claim 1, wherein a display area comprises:

a plurality of first signal lines configured to supply the video voltage to the gates of the drive transistors of the pixels that are arrayed next to one another in a second direction; and a plurality of second signal lines configured to supply the initialization voltage and a second initialization voltage to the gates of the drive transistors of the pixels that are arrayed next to one another in the second direction.

5. The display device according to claim 1, wherein a display area comprises a plurality of first signal lines configured to supply, to the gates of the drive transistors of the pixels that are arrayed next to one another in the second direction, the video voltage and the initialization voltage and a second initialization voltage in a time-divisional manner within each horizontal scan period.

6. The display device according to claim 1, wherein the shut-off circuit is configured to supply or shut off an initialization current to the drive transistor in response to the luminance set value, which is configured to be set at different values.

* * * * *